(12) United States Patent
Sanocki et al.

(10) Patent No.: US 10,551,993 B1
(45) Date of Patent: Feb. 4, 2020

(54) VIRTUAL REALITY CONTENT DEVELOPMENT ENVIRONMENT

(71) Applicant: GOOGLE LLC, Mountain View, CA (US)

(72) Inventors: Tom Sanocki, Bellevue, WA (US); Natalie Burke, Seattle, WA (US); Jonathen Collins, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 125 days.

(21) Appl. No.: 15/595,889

(22) Filed: May 15, 2017

Related U.S. Application Data

(60) Provisional application No. 62/336,732, filed on May 15, 2016, provisional application No. 62/403,519, filed on Oct. 3, 2016.

(51) Int. Cl.
*G06F 3/0481* (2013.01)
*G06F 3/0484* (2013.01)
(Continued)

(52) U.S. Cl.
CPC ........ *G06F 3/04815* (2013.01); *A63F 13/211* (2014.09); *A63F 13/533* (2014.09);
(Continued)

(58) Field of Classification Search
CPC .................................................. G06F 3/04815
(Continued)

(56) References Cited

U.S. PATENT DOCUMENTS 6,570,563 B1 * 5/2003 Honda .................... G06T 19/00
345/419
7,441,201 B1 * 10/2008 Printezis ................. G06F 9/451
715/762

(Continued)

OTHER PUBLICATIONS

"EditorVR Experimental Build Available Today", Unity Technologies, https://blogs.unity3d.com/2016/12/15/editorvr-experimental-build-available-today/, accessed Jul. 26, 2017.
(Continued)

*Primary Examiner* — Reza Nabi

(57) ABSTRACT

A computer-implemented content development environment enables creation of interactive characters and other digital assets for use in various types of 3D content. In this context, 3D content generally may refer to any type of content (e.g., short films, video games, educational content, simulations, etc.), including VR content that can be consumed by viewers using one or more types of VR devices. In many instances, 3D content may be generated using visualization and/or input mechanisms that rely on VR equipment, including one or more three dimensional, computer-generated environments (either real or fantastical) that a viewer can explore using VR devices in similar fashion to how the viewer might explore the real world. For example, a viewer may use a head-mounted display (HMD) device, various motion detecting devices, and/or other devices to simulate the experience of exploring a landscape. One or more different types of VR devices may be used to simulate various sensory experiences including sight, motion, touch, hearing, smell, etc.

14 Claims, 17 Drawing Sheets

(51) Int. Cl.
    *G06T 19/00*     (2011.01)
    *G06F 3/01*     (2006.01)
    *G06F 3/0482*     (2013.01)
    *G06T 13/20*     (2011.01)
    *A63F 13/533*     (2014.01)
    *A63F 13/56*     (2014.01)
    *A63F 13/211*     (2014.01)
    *H04L 29/08*     (2006.01)

(52) U.S. Cl.
CPC .............. *A63F 13/56* (2014.09); *G06F 3/011* (2013.01); *G06F 3/017* (2013.01); *G06F 3/0482* (2013.01); *G06F 3/04842* (2013.01); *G06F 3/04845* (2013.01); *G06T 13/20* (2013.01); *G06T 19/003* (2013.01); *H04L 67/1097* (2013.01); *A63F 2300/105* (2013.01); *A63F 2300/305* (2013.01); *A63F 2300/6607* (2013.01); *G06T 2200/24* (2013.01); *G06T 2219/024* (2013.01)

(58) Field of Classification Search
USPC ........................................................ 715/757
See application file for complete search history.

(56) References Cited

U.S. PATENT DOCUMENTS

| | | | | |
|---|---|---|---|---|
| 9,665,170 | B1* | 5/2017 | Ross | G06F 3/011 |
| 9,721,386 | B1* | 8/2017 | Worley, III | G06T 19/006 |
| 9,871,774 | B1* | 1/2018 | Liu | H04L 63/0435 |
| 2007/0239409 | A1* | 10/2007 | Alan | G06F 17/5009 703/2 |
| 2012/0019526 | A1* | 1/2012 | Jung | G06T 11/00 345/419 |
| 2013/0187930 | A1* | 7/2013 | Millman | G06T 13/20 345/473 |
| 2014/0168243 | A1* | 6/2014 | Huang | G06T 1/20 345/522 |
| 2015/0143302 | A1* | 5/2015 | Chang | G06F 3/04815 715/849 |
| 2015/0347104 | A1* | 12/2015 | Goossens | G06F 9/44526 717/151 |
| 2015/0348305 | A1* | 12/2015 | Goossens | G06T 5/00 345/419 |
| 2016/0005207 | A1* | 1/2016 | Jeon | G06T 13/20 345/633 |
| 2016/0071318 | A1* | 3/2016 | Lee | G06T 17/00 345/419 |
| 2016/0140930 | A1* | 5/2016 | Pusch | G06F 3/011 345/633 |
| 2016/0257000 | A1* | 9/2016 | Guerin | B25J 9/1605 |
| 2016/0260251 | A1* | 9/2016 | Stafford | G02B 27/0179 |
| 2017/0068323 | A1* | 3/2017 | West | G06F 3/017 |
| 2017/0286650 | A1* | 10/2017 | Hook | G06F 21/31 |
| 2017/0337726 | A1* | 11/2017 | Bui | G06T 15/04 |
| 2017/0358141 | A1* | 12/2017 | Stafford | G06F 3/0482 |
| 2018/0005015 | A1* | 1/2018 | Hou | G01S 17/023 |
| 2018/0015373 | A1* | 1/2018 | Greenberg | A63F 13/833 |
| 2018/0043247 | A1* | 2/2018 | Vandonkelaar | A63F 13/213 |
| 2018/0169517 | A1* | 6/2018 | Balest | A63F 13/26 |
| 2018/0204276 | A1* | 7/2018 | Tumey | G06Q 30/0643 |
| 2018/0234676 | A1* | 8/2018 | Cole | H04N 17/002 |
| 2018/0300958 | A1* | 10/2018 | Schriber | G06T 19/20 |
| 2018/0306898 | A1* | 10/2018 | Pusch | G06F 3/011 |
| 2018/0342106 | A1* | 11/2018 | Rosado | G06T 19/006 |

OTHER PUBLICATIONS

"Tvori", Tvori, http://tvori.co/, accessed Jul. 26, 2017.
"Unreal Engine VR Editor", Epic Games, Inc., https://docs.unrealengine.com/latest/INT/Engine/Editor/VR/, accessed Jul. 26, 2017.

* cited by examiner

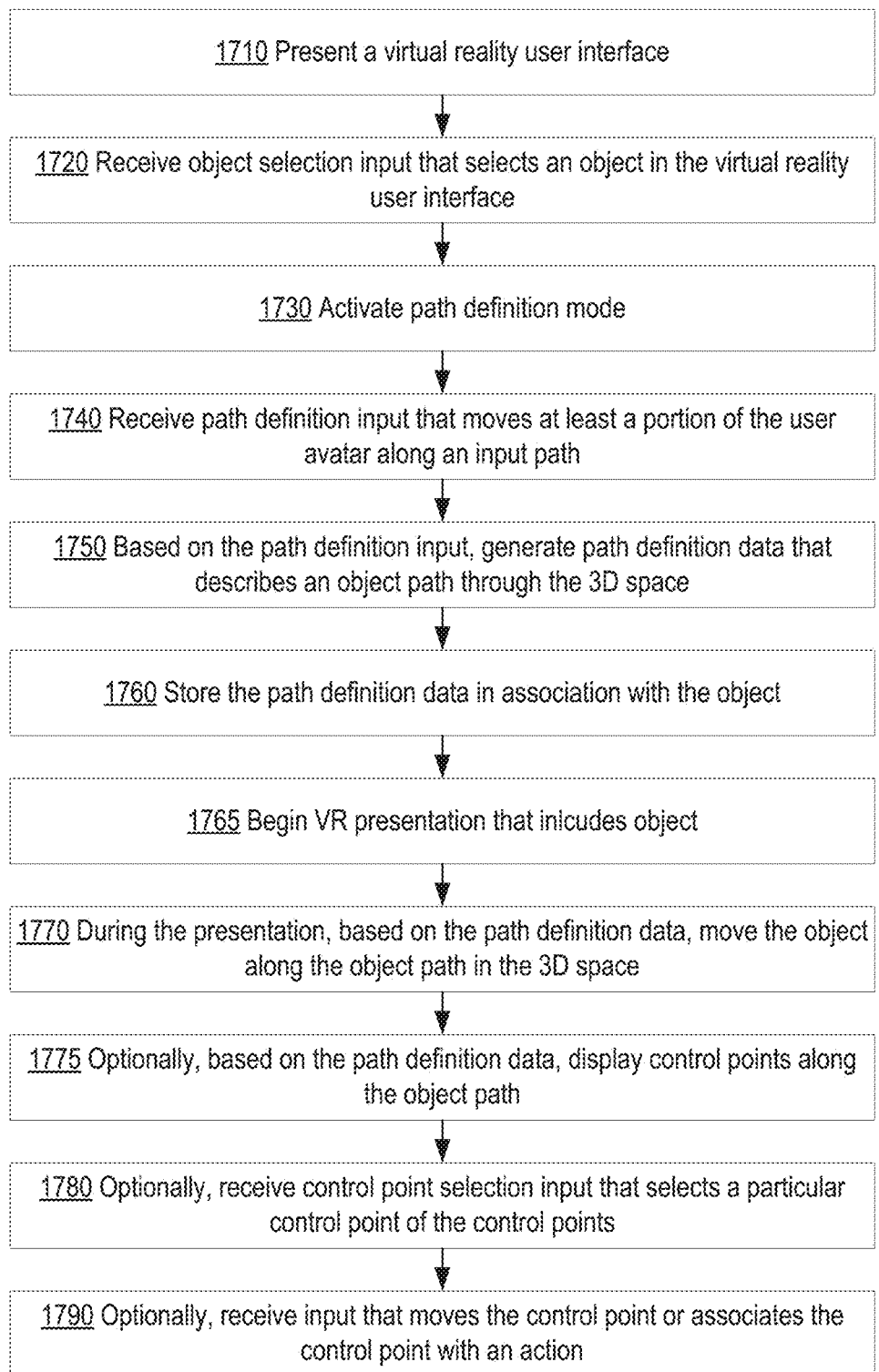

VIRTUAL REALITY CONTENT DEVELOPMENT ENVIRONMENT

PRIORITY CLAIM

This application claims benefit under 35 U.S.C. § 119(e) of Provisional Application No. 62/336,732, filed May 15, 2016, and further claims benefit under 35 U.S.C. § 119(e) of Provisional Application No. 62/403,519, filed Oct. 3, 2016, the entire contents of each of which is hereby incorporated by reference as if fully set forth herein.

TECHNICAL FIELD

Embodiments relate generally to computer-implemented development environments for creating three-dimensional content, such as for interactive virtual reality experiences and other applications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Most types of multimedia content today are displayed and viewed on stationary two-dimensional displays. For example, movies, television shows, video games, etc., typically are consumed by viewers on a stationary display such as a television screen, computer display, or mobile device display. However, the recent popularization of powerful virtual reality (VR) devices has ushered in the creation of new types of immersive media where rather than viewing content on a simple two-dimensional display, viewers can experience various types of multimedia content in simulated three-dimensional environments, as if they were within the environment directly.

One popular type of device for consuming VR content is a head mounted display (HMD) device, where an HMD provides with a view of a three-dimensional VR environment. To simulate the experience of looking around a three-dimensional environment, an HMD typically includes displays embedded in a wearable visor that enable a user to "see" the environment, and head tracking components that enable and look around at different parts of the environment. Other types of VR devices that can be used with or in place of an HMD include hand tracking devices, body tracking devices, and other devices which enable viewers to interact with VR environments in a variety of ways. For example, a viewer wearing an HMD may rotate his or head to dynamically view different parts of an environment, hand tracking devices may be used to move simulated arms and to "touch" objects within a VR environment, and so forth, thereby simulating the experience of interacting with a real world environment.

The process of creating multimedia content for consumption by such VR devices presents a number of challenges, such as arranging and controlling objects within a three-dimensional space. Other challenges include defining and manipulating interactive characters. For example, a VR content creator may desire to create an environment that includes one or more human characters, fantastical characters, anthropomorphic characters, and/or other types of characters to make the environment more engaging. One way to make such characters feel convincing to the viewer is to make the characters look as lifelike as possible. However, the illusion of reality in the VR environment may be lessened if the characters appear oblivious to the viewer's presence in the environment (e.g., when the viewer approaches a character, touches a character, speaks to a character, etc.).

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 17 depicts an example flow diagram of a flow for creating a character interaction graph.

DETAILED DESCRIPTION

Figure 1:
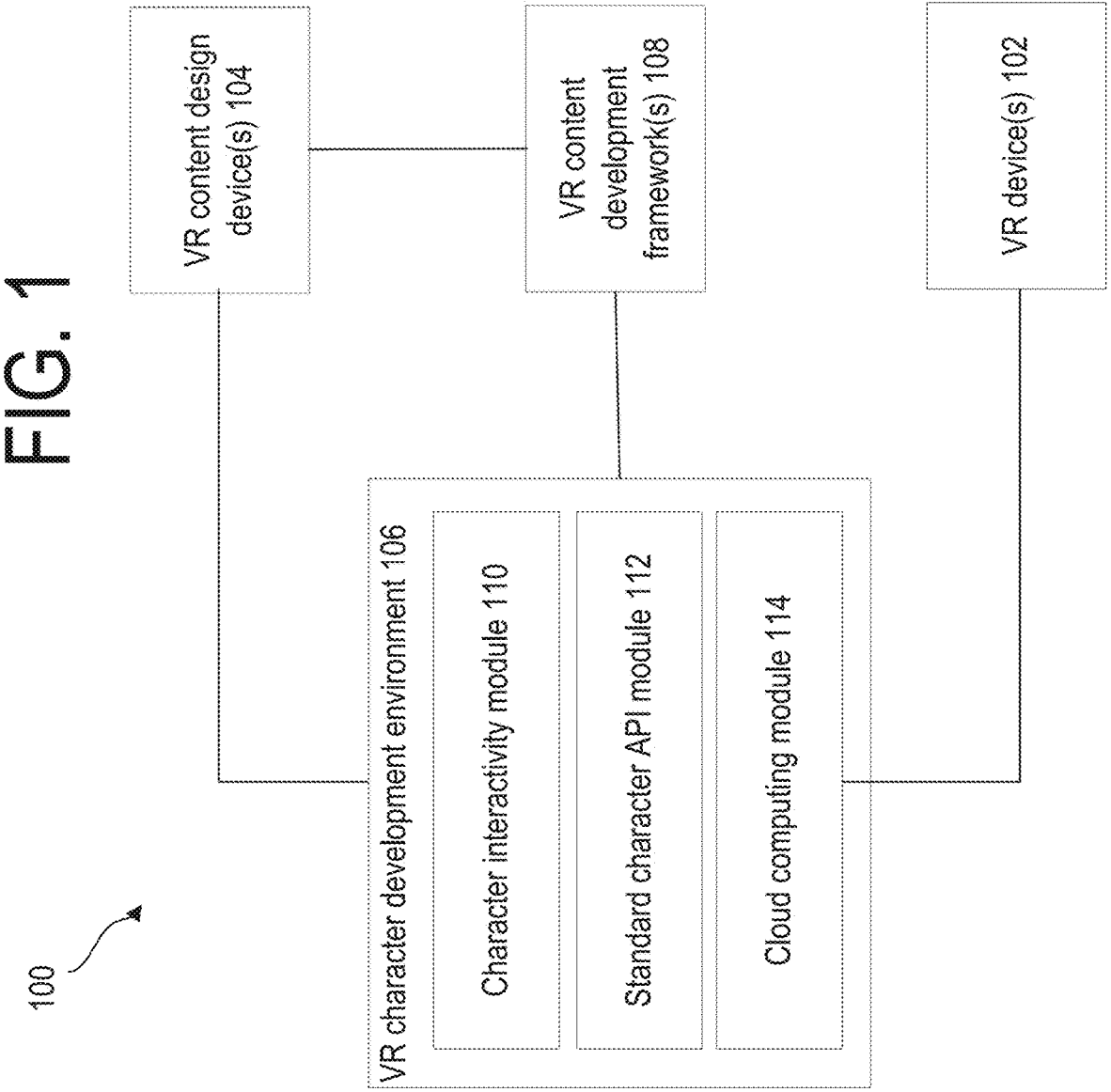
FIG. 1 is a block diagram of an example system for implementing a VR content creation environment, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
3.0. Functional Overview
3.1. Input Detection
3.2. Object Selection Techniques
3.3. Option/Command Selection Techniques
3.4. Navigation Techniques
3.5. Adding Items to a Scene
3.6. Movement Path Creation Techniques
3.7. Path Manipulation Techniques
3.8. Animating Moving objects
3.9. Integrating Movement with Interactivity
3.10. VR Training Techniques
3.11. Data Storage and Retrieval Techniques
3.12. Character Interaction Graphs
3.13. Standard Character APIs
3.14. Cloud-Based Content Creation
3.15. Other Development Environment Features
4.0. Example Implementations
4.1. Illustrations of Example Development Environment
4.2. Example VR-Assisted Content Development Walkthrough
4.3. Example Character Interaction Graph Creation Flow
4.4. Example Path Creation Flow
5.0. Example Embodiments
6.0. Implementation Mechanism—Hardware Overview
7.0. Extensions and Alternatives 1.0. General Overview Approaches, techniques, and mechanisms are disclosed that enable computer-aided creation of three-dimensional content. The created content may be any type of content (e.g., films, video games, educational content, simulations, etc.). In some embodiments, the content may be consumed by viewers using one or more types of VR devices, and is thus considered VR content. In many instances, the created content may be created using interfaces comprising visualizations generated by VR equipment and/or input mechanisms enabled via VR equipment. For example, a user may develop content in one or more three dimensional, computer-generated environments (either real or fantastical) that a viewer can explore using VR devices in similar fashion to how the viewer might explore a real world environment. For instance, a viewer may use a head-mounted display (HMD) device, various motion detecting devices, and/or other devices to simulate the experience of exploring a landscape. One or more different types of VR devices may be used to simulate various sensory experiences, including sight, motion, touch, hearing, smell, etc. In other embodiments, the created three-dimensional content may also or instead be played back using more conventional playback mechanisms, such as projecting the three-dimensional content into a two-dimensional space or stereoscopic three-dimensional space on a standard television, computer monitor, or another screen.

According to an embodiment, content is created at least partially using VR-assisted interfaces. A VR-assisted content development environment may include, for example, one or more avatar-based interfaces for generating and manipulating movements and animations of characters and other objects. The avatar is a visual representation of the user within a three-dimensional (3D) space simulated by the VR-assisted content development environment. The avatar generally has a torso, limbs, and/or other body parts whose positions and/or orientations within the 3D space are controlled by corresponding motions of the user (as detected by motion-detection equipment). The VR-assisted content development environment provides an intuitive mechanism for a user to define a path over which an object moves over time in the 3D space. For instance, the user may define the path, and optionally the speed of the object along the path, simply by moving the avatar within the 3D space using motions detected by motion detection equipment. Additionally, or instead, a user may manipulate control points for the path by reaching for, grabbing, and moving manifestations of those control points in the 3D space. Similar techniques may allow a user to associate animations with path control points. The VR-assisted content development environment may include yet other interface mechanisms for generating and manipulating movements and animations.

According to an embodiment, a VR-assisted content development environment may include one or more interfaces for generating and manipulating a scene of three-dimensional content. Using interface techniques described herein, a user may place characters or other objects at specific positions within the simulated 3D space of the VR-assisted content development environment. Further using interface techniques described herein, the user may define movement paths and/or animations of the objects over a period of time corresponding to a timeline of the scene. The objects may move or be animated concurrently with each other. The user may further define interactions using interface techniques described herein. The user may instruct the VR-assisted content development environment to store data describing the defined objects, positions, movements, animations, and/or interactions. The user may share the data with other users, who may view and potentially interact with the scene in a content playback environment, which may be presented in a VR environment using VR equipment as described herein, in a 3D space rendered in two dimensions on a conventional computer monitor (e.g. as part of an interactive video game, non-interactive movie, etc.), or using any other suitable technique for rendering three-dimensional content.

Some types of three-dimensional content may include one or more characters in the content environments. For example, a VR video game may include one or more human characters (e.g., friendly characters, enemy characters, etc.) as part of the gaming experience. As another example, a VR movie may include a variety of characters as part of a story, including human characters, animal characters, fantastical characters, anthropomorphic characters, etc. Depending on the embodiment, a user may or may not be able to interact with the created content.

To increase a sense of realism and immersion in created content, a creator of VR content may desire to create and configure characters which respond to viewer actions in ways that approximate how a viewer might expect a similar character to respond in real life. For example, if a person approaches another person on the street in real life, the other person might typically make eye contact and possibly perform other actions (e.g., say "hello," wave his or her hand, move out of the approaching person's path, etc.). As another example, the other person may typically perform certain actions if the approaching person reaches out to the person (e.g., to shake hands, give a high five, etc.), if one person speaks to the other person, if one person moves in close proximity to the other person, etc. In real life, each of these actions and others typically evoke a set of reactions from one or both persons that make sense in the context of the encounter.

According to certain embodiments described herein, a computer-implemented content development environment is described that enables users to easily create, configure, and integrate interactive characters into content. As used herein, an interactive character may refer to any type of entity present within content with which a viewer may interact as the viewer consumes the content. For example, a VR short film may include an interactive animal character (e.g., a bird on a beach), a VR video game may include one or more interactive human characters, and so forth, each of which may be configured to interact with the viewer in various ways.

In an embodiment, a content development environment may include one or more interfaces for creating character interaction graphs. An interaction graph includes a set of nodes that collectively define how a character behaves in response to various types of input. In some embodiments, in addition to or instead of conventional inputs (such as from a game controller, mouse, or keypad), such inputs may be captured from VR devices. In contrast to traditional media content viewing experiences, as a viewer consumes VR content using one or more VR devices, a wealth of information may be available that describes the viewer's current state within the VR environment. For example, information may be available from various VR devices worn by the viewer that indicate a direction the viewer is facing, movement of the viewer's head and/or other body parts, voice and/or other sound created by the viewer, etc. As described in more detail hereinafter, in one embodiment, each of these types of input, character conditions, environment conditions, and other variables may be used to define character interaction graphs and apply the graphs to characters to define how the characters interact as viewers consumes VR content containing the characters.

According to an embodiment, a VR-assisted content development environment includes various improved interface mechanisms. For example, an interface mechanism for selecting an object with which to perform an editing operation comprises detecting that an avatar's hand controlled by the user is approximately co-located with a visual representation of that object in a 3D space, and further detecting input indicating a grabbing motion. As another example, an interface mechanism for selecting between multiple options in a menu comprises presenting visual representations of certain options on a wheel, disc, globe, or other rotatable shape in the 3D space, detecting that an avatar's hand controlled by the user is approximately co-located with the rotatable shape, detecting input indicating a spinning or scrolling motion, and rotating the shape such that the visual representations are in different positions relative to the avatar. As another example, an interface mechanism for selecting an option comprises showing control buttons corresponding to options on a visual representation of an avatar's limb (e.g. on an arm, palm, or wrist), moving the visual representation in correspondence to detected motion of a corresponding limb of the user, and detecting that the user has moved a finger of the avatar within the 3D space to an approximate position of the button.

As another example, help or assistance may be provided by interactive characters or other objects encountered by the user's avatar within a VR-assisted content development environment. Responsive to spoken questions or other promptings from a user, these characters or other objects visually demonstrate physical movements of a user's body by which the user may instruct the VR-assisted content development environment to take certain actions, such as movements of the user's hands and/or limbs to provide inputs such as described herein.

In other aspects, the invention encompasses a computer apparatus and a computer-readable medium configured to carry out the foregoing techniques.

2.0. Structural Overview

System 100 illustrates an example system for implementing a content development environment. In one embodiment, system 100 includes a content development environment 106, VR content development framework(s) 108, VR content design device(s) 104, and VR device(s) 102. Although a specific system is described, other embodiments are applicable to any system that can be used to perform the functionality described herein. Components of the system 100 may be connected by, for example, a Local Area Network (LAN), Wide Area Network (WAN), wireless network, the Internet, Intranet, Extranet, etc. In an embodiment, links between components of system 100 may each comprise a network link or cable. Alternatively or additionally, any number of components within the system 100 may be directly connected to each other through wired or wireless communication segments.

In an embodiment, VR devices 102 generally represent any type of device or set of devices that enable viewers to consume one or more types of VR content. Examples of VR devices 102 include, but are not limited to, head mounted displays (HMDs) (e.g., Oculus Rift, PlayStation VR, HTC Vive, etc.), holographic projection devices, simulator devices, multimodal devices (e.g., wired gloves, omnidirectional treadmills, etc.), cameras or other optical sensors configured to detect motion, personal computers, mobile devices, etc., or any combination thereof.

In an embodiment, VR content design device(s) 104 represent any type of one or more computing devices which enable users (e.g., VR content creators, character designers, etc.) to create content using the described techniques. Examples of VR content design devices 104 include, but are not limited to, personal computers, laptops, workstations, cloud computing systems, embedded devices, computer graphics devices, gaming devices and consoles, etc. The VR content design devices 104 may be used at various stages of a VR content creation process to produce VR content using a content development environment 106 and/or one or more VR content development framework(s) 108 via various tools and/or interfaces.

In one embodiment, the VR content design devices 104 may include one or more VR devices (e.g., one or more VR devices 102), and a content development environment 106 may include one or more graphical interfaces with which a content creator can interact in a VR environment. For example, a content creator may create a character interaction graph in a VR environment by dragging and connecting graph nodes with hand controllers. As described in more detail hereinafter, a character interaction graph includes a set of nodes representing various points of an interaction with a particular character. If a particular VR character has been associated with an interaction graph under construction, a visual representation of the character may be displayed in the same VR environment and the character may play automatically in response to changes to the interaction graph.

As another example, character dialog and/or animations may be configured in a VR environment (e.g., a user may speak into an input device and the user's voice may be automatically recorded as a dialog clip for a VR character under development). As yet another example, a user may use one or more VR devices 102 to create character animations. For example, a user may use one or more VR devices to manipulate a character under development using motion controllers or hand tracking, similar to how the user may pose an action figure or marionette in real life. A user may be able to pick up a character with the motion controller and/or hand tracking and manipulate the character directly, such as moving the character in a curve by tracing out the curve with the user's hand. As yet another example, animations for a VR character under development can be recorded by a user moving motion controllers around in a particular pattern within a VR environment. The user may be able to scale the entire VR development view up and down (e.g., so that the user can do detail work in small sections, or see a big picture view of an environment).

In an embodiment, a content development environment 106 may include one or more VR-assisted interfaces where a user can view a character under development on a turntable in VR. For example, the user may be able to grab turntable (via motion controllers, hand tracking, etc.) and rotate the view of the character. As another example, a content creator may use one or more VR devices to adjust a virtual lamp to control lighting on the character.

In an embodiment, one or more flat screen interfaces may be available to enable VR content creators to use more traditional VR content design devices 104 (e.g., a personal computer) to create interaction graphs, characters, character animations, etc.

In an embodiment, content development environment 106 represents any set of hardware and/or software configured to enable the creation of three-dimensional scenes, characters, character interaction graphs, and other digital content. In one embodiment, content development environment 106 may be configured as a plug-in, extension, add-on, or other type of application configured to work with one or more VR content development frameworks 108. In other examples, content development environment 106 may include a set of APIs accessible to a VR content development framework 108, and/or a VR content development framework 108 may be an integrated component of the VR-assisted content development environment 106. A content development environment 106 may include various modules including, but not limited to, a character interactivity module 110, a standard character API module 112, and a cloud computing module 114. Functionality related to each of these modules is described in separate sections hereinafter.

In one embodiment, a content development environment 106 may include a cloud computing module 114. In general, a cloud computing module 114 may include any set of cloud computing services with which VR content design devices 104 and/or VR devices 102 may interface to facilitate character creation, character interaction graph creation, character playback, etc. In this context, cloud computing services generally refer to one or more computing services hosted by one or more cloud computing service providers and that are accessible to end users over a network. Examples of cloud computing service providers include, but are not limited to, Amazon AWS, Microsoft Azure, and Google Cloud Platform. As one example, a content creator may use a client application at a VR content design device 104 which communicates with cloud computing module 114 to facilitate creating, customizing, and storing scenes of content, characters or other objects, animations, interaction graphs, etc., on the cloud. In one embodiment, an application may communicate with a cloud computing module 114 via one or more APIs.

In an embodiment, VR content running on VR devices 102 may also communicate with a cloud computing module 114 to provide real time streaming of certain VR assets and other features. For example, a cloud computing module 114 may be configured to receive raw input data from VR devices 102 (e.g., gaze data, voice input data, motion data, etc.) while viewers are consuming VR content, and cloud computing module 114 may include one or more resources for processing the input and determining character actions. The result of such processing may be sent back to the VR devices for use in playback of content and/or in rendering a VR-assisted content development environment, thereby offloading certain types of character processing to the cloud.

In one embodiment, a cloud computing module 114 may include computing resources which may be dedicated to each of hundreds or thousands of characters inhabiting a space. The ability to handle the processing for large numbers of characters may be challenging for local VR devices, and may be more efficiently handled by greater computing resources available in the cloud. This ability to offload certain types of character processing may be highly beneficial as VR devices typically attempt to maintain a refresh rate of 90 frames per second (fps) to maintain a clear image for the viewer.

In an embodiment, storage of character data and/or other scene data by a cloud computing module 114 may enable streaming of character data and/or other scene data on demand to content design devices 104 and/or VR devices 102. For example, characters, character animations, character accessories, etc., may be sent to VR devices 102 dynamically as the devices execute VR content. For example, if a viewer is consuming VR content where the viewer walks down a busy street filled with various characters, the viewer's VR device may wait to load the characters, character animations, interaction data, etc., from the cloud until the viewer is walking down the busy street and the characters are in view. In other examples, cloud storage of character data enables content creators to build character content (e.g., entire characters, character animations, textures, accessories, etc.) and host the content on the cloud for streaming to client VR devices 102 on demand.

In an embodiment, VR content development framework(s) 108 represent any set of hardware and/or software configured to enable creating various types of digital media content, including VR media content. Examples of VR content development frameworks 108 may include one or more game engines (e.g., Unity, Unreal, RenderWare, etc.) or any other framework and/or tools for assisting in the creation of VR content. As indicated above, a VR content development framework 108 may interface with a content development environment 106 via one or more APIs, plug-ins, extensions, graphical interfaces, etc. In other examples, a content development environment 106 may include one or more integrated VR content development frameworks 108, or vice versa.

System 100 illustrates only one of many possible arrangements of components configured to provide the functionality described herein. Other arrangements may include fewer, additional, or different components, and the division of work between the components may vary depending on the arrangement. For example, in certain embodiments, rather than utilizing VR devices 102 for playback of content, the content may be played by other devices, such as conventional computer devices or other media equipment in a two-dimensional environment. In any event, each component of system 100 may feature an open port, API, or other suitable communication interface by which the component may become communicatively coupled to other components of system 100 as needed to accomplish any of the functions of system 100 described herein.

3.0. Functional Overview

The arrangement of FIG. 1 may, in an embodiment, implement a VR-assisted content development environment which enables content creators to create scenes of potentially interactive 3D content, and/or elements thereof. For example, a VR-assisted content development environment may provide interfaces for defining positions of characters and/or other objects in a 3D space, movements of the objects over time, animations of the objects, and so forth. These interfaces may further have applications beyond the VR-assisted content development environment, such as in VR-based games or other applications where a user may provide input to select commands, navigate a three-dimensional space, position objects within a three-dimensional space, or manipulate objects.

In an embodiment, a content development environment may provide interfaces for users to create interactive characters and other digital assets for use in various types of content. For example, a content development environment 106 may provide various interfaces, possibly in conjunction with one or more VR content development frameworks 108, which enable users to create, customize, and configure interactivity for characters to be used in VR content. Among other functionality, these interfaces may enable users to create character "interaction graphs," where an interaction graph defines how a character interacts with a viewer based on various types of input from a viewer's VR devices and/or other conditions of a VR environment. By applying these customized interaction graphs to characters, content creators are able to create characters that interact with viewers in ways that were not previously possible or were cumbersome to produce.

In an embodiment, each of the processes described in this section may be implemented using one or more computer programs, other software elements, and/or digital logic in any combination of general-purpose computing devices or a special-purpose computing devices, while performing data retrieval, transformation, and storage operations that involve interacting with and transforming the physical state of memory of the computing devices(s). In some embodiments, the processes are implemented in a system comprising VR development devices, cloud computing services, and VR devices. In other embodiments, the processes are implemented exclusively by one or more servers or by a single client computing device. Examples of such systems are described in reference to FIG. 1.

3.1. Input Detection

A variety of types of input may be utilized for controlling the various functionalities described herein. Beyond conventional inputs, such as from a game controller, keyboard, touchscreen, or mouse, the inputs may include certain types of inputs optimized for use with VR equipment, such as movements of the human body detected by motion detection equipment, or neural inputs detected by a brain control interface.

In one embodiment, one type of input that may be integrated into the system is voice input from the viewer. For example, a content development environment may include one or more APIs to integrate off-the-shelf or cloud-based voice recognition software, such as, for example, PocketSphinx, Amazon Alexa, Apple Siri, Bing voice recognition, IBM Watson voice recognition.

As another example, another type of viewer input that may be detected includes various types of movement of a viewer's body. For example, such movements may roughly correspond to the viewer nodding or shaking his or her head, waving a hand, pointing in a particular direction with a hand, walking in a particular direction, crouching, etc. In one embodiment, detecting movement of a viewer's body may include detecting positioning and/or rotation of a head mounted display (HMD), detecting hand position and/or rotation of hand-held motion controllers, detecting body part positioning based on wearable sensors, camera-based finger or body part tracking technology, etc.

In one embodiment, a direction of a user's gaze may be detected as input. For example, if the viewer is wearing a HMD, the HMD may be used to track position and rotation of the viewer's head to deduce a direction the viewer is looking in an environment. In other examples, eye tracking technology may be used to more accurately determine where a viewer is looking.

In one embodiment, a distance between two or more objects in a VR environment may be determined. For example, distances to a virtual character may be tracked by comparing a world space position of an avatar controlled by VR equipment with a world space position of the virtual character. As another example, VR devices may include built-in face cameras to allow recording and interpreting facial expressions (e.g., smiling, frowning, smirking), and that information may be used to change viewer avatar and/or character facial expressions. In one embodiment, VR devices may track biometric signals such as pulse, heart rate, perspiration, which may be interpreted as different emotions (e.g., nervous, scared, surprised, etc.), and that information similarly may be used to modify avatar and/or character expressions, and/or to trigger actions on digital characters in a VR-assisted content development environment or content playback environment.

3.2. Object Selection Techniques

In an embodiment, a user may wish to select an item to edit or to otherwise manipulate, such as a character or other object, control point, animation, etc. The content development environment (also referred to herein as a VR environment) depicts a visual representation of the item at a specific position associated with the item in the 3D space of the environment. The specific position, and in fact the item itself, may be described by data objects within data stored locally and/or in the cloud for the scene.

For example, an editable data object representing a bird in a scene may be depicted using a visual representation of the bird. The visual representation may be presented using a certain effect to indicate that selection of the representation allows a user to manipulate the object corresponding to the representation. For example, editable objects may be presented with highlighting, glowing, or color effects, or surrounded by certain indicia such as arrows, bubbles, labels, and so forth. Optionally, in some embodiments, the effect is only presented when the user's avatar is within a certain distance of the visual representation.

A user may select the item to edit by moving (e.g. walking, teleporting, etc.) the user's avatar within a certain distance of the visual representation of the item. Optionally, the user may be required to provide certain additional input such as clicking a button or selecting an interface control. In an embodiment, selecting the item may comprise extending a hand out of the avatar towards the visual representation and providing the additional input. Further examples of such additional input may comprise, for example, completing a pointing or grabbing motion with the user's fingers, or pressing or pulling a physical button or trigger on a handheld controller.

Once an item is selected, a user may perform various actions with the item by selecting commands using other described techniques. For example, in an embodiment, the user may edit a position of the item by moving the avatar (or at least the hand of the avatar) to a different position and providing some other input, such as ceasing a grabbing or pointing motion, or pressing or releasing a certain button. Or a user may change an attribute of the item (e.g. color, associated animation, size, etc.), or even erase an item, using various command inputs.

3.3. Option/Command Selection Techniques

In an embodiment, menus of options or commands may be presented to a user visually within the VR environment. For example, in an embodiment, various options in a menu of options may be presented as textual labels or corresponding visual representations within a visual container, such as a wheel, globe, box, backpack, chest, and so forth. Such a container is also described herein as a menu container. The textual label or visual representation of an option or command within such a container is referred to herein as a menu icon. Each menu icon may be presented as a selectable item within the container that is selected using techniques such as described above and/or conventional navigational input. Visual representations of options may optionally be 3D representations, and even include animations intended to illustrate some feature or aspect of the option. In an embodiment, each icon is a 3D bubble surrounding some animated object representative of the corresponding option.

A container may be completely or partially transparent, such that a user may reach for and select icons within the container directly. Or, a container may be completely or partially opaque. In some embodiments, to render items in the container visible, the user may be required to provide some input that indicates that the user wishes to look inside the container, such as bringing an avatar near the container and selecting the container. In some embodiments, a container may become visible and/or grow in size as a user approaches a position associated with the container in the 3D space, so that the user becomes aware of its existence. In other embodiments, the VR environment may be configured to place a container within the vicinity of the user's avatar or an object related to the menu in response to input that indicates that the user wishes to see a corresponding menu. For example, the VR environment may place a container for an "add character" menu in front of the user in response to a user requesting such a menu vocally, or pressing on a certain button.

Items may be presented within a container using a variety of techniques. For example, icons may be placed at positions approximately equidistant from each other on the surface of a disc or globe. The positions of the icons may rotate in response to input that spins or scrolls the container. Optionally, for larger menus, where it might be difficult to depict all options at once, such input may further cause icons rotating away from the avatar to disappear and be replaced by new icons, rotating towards the avatar, for options or commands that were not previously depicted. As another example, icons may be depicted as loose items within a container, such that a user may locate a command or option by rummaging through icons as if they were in a bag of luggage or desk drawer.

According to an embodiment, options may be depicted as buttons or other controls affixed to the user's avatar. A user may thus, for example, provide input that causes the avatar's vison to be directed to the avatar's arm, wrist, thigh, chest, or other body part. Such input may, for instance, involve the user moving his head or eyes in the direction of the relevant avatar body part, or moving a body part of the user that controls the relevant avatar body part up into a position viewable to the user in the VR environment. Once the button is visible, to select the option, the user may, for example, move an arm of the user in a manner such that a finger or other digit of the avatar approaches or touches the button. Optionally, to confirm selection of the button, a user may be required to pull a trigger in the user's hand or provide some other additional input. In some embodiments, avatar-affixed buttons or other controls may be selected even without bringing the body part to which the controls are affixed into view. For example, a user may touch a button on the avatar's wrist without looking at the button.

In an embodiment, other types of controls may also be affixed to a user's avatar. For example, a rotatable armband may be worn by the avatar, and different menu options may correspond to different rotations of a fixed point on the armband. Or, the avatar may wear a watch whose face is rotatable to indicate different options. Or a virtual joystick or touchpad may be mounted on the avatar's palm. It should be remembered that these controls are virtual. The user, of course, need not be wearing corresponding physical controls on the user's body in real-life.

A selected option may result in issuing a command that immediately performs an action, or the option may change a state of the avatar, of an object within the scene, or of the VR environment in general. In the latter case, the control or item corresponding to a selected option may be subsequently depicted in a visually distinguishable manner, such as a change in highlighting, size, color, etc. Similarly, visual or tactile feedback may briefly be given to indicate that a user's action has selected an item.

3.4. Navigation Techniques

According to an embodiment, a user may navigate a three-dimensional space by, for example, walking, using a gamepad, moving the user's head, or performing any other motion that is detectable by motion detecting equipment. Such input changes the position and/or orientation of the avatar within the 3D space, and consequently changes what is visible in the avatar's viewport. Moreover, such input changes the distance and/or orientation of the user's avatar relative to objects in the 3D space, thus triggering actions that are a function of the avatar's distance to an object.

In an embodiment, the VR environment may include a number of virtual controls to simplify navigation within the VR environment. For example, the VR environment may include controls to zoom in and out, such that the world scales to a bigger or smaller size, respectively. For instance, in an embodiment, the left wrist or forearm of the user's avatar may include+ and −buttons that zoom in and out, respectively. This may enable a user to better manipulate and/or visualize micro or macro level details of the scene, respectively.

As another example, the VR environment may include teleport controls by which a user may immediately change the position of the user's avatar to another defined position. The 3D space may include a number of teleport points, which may be predefined and/or user-configurable. Such points may be indicated by special indicators within the 3D space, such as colored cubes or spheres, portals, and so forth. In an embodiment, a user may add, select, or move such indicators within the 3D space just as they would any other item, and thus add a teleport point or change an associated teleport point.

In an embodiment, similar indicators may be shown as selectable icons in a menu container or on avatar-affixed menu controls. Each such indicator corresponds to a command to teleport to the teleport point associated with the indicator. For example, the left forearm or wrist of the avatar may include buttons with colored cube icons. Pressing one of these buttons teleports the avatar to a teleport point marked in the 3D space by a cube of the same color.

3.5. Adding Items to a Scene

According to an embodiment, a user may add an item to a scene by providing command selection input that requests a menu from which a user may select the item to add. Such menus may be text-based and/or visual. For example, in one embodiment, a box, desktop, drawer, or other container may be presented in which text or visual representations of various items are shown. A user may select one of these items (e.g. using one of the afore-mentioned techniques, or any other suitable selection input), and move it from the container to a specific position in the 3D space. Data describing the item and its position will then be stored in association with the scene. A menu may also include items corresponding to submenus, which a user may select and open, thereby allowing for hierarchical categorization of items.

In an embodiment, available items to add to a scene may be provided from a marketplace of items. Via such a marketplace, a user may purchase or otherwise obtain characters or other objects, animations, backgrounds, etc. Users may furthermore upload their own characters, objects, and so forth. Selection of an item may purchase the item from the marketplace, or present a menu or dialog by which a user may confirm purchase of the item. Or, a user may purchase the item separately, and only items already purchased by the user may be shown to the user. In an embodiment, certain items (including objects, animations, etc.) need not be purchased while the user is creating a scene, but must be purchased once the user wishes to share the scene.

3.6. Movement Path Creation Techniques

According to some embodiments, a user may provide various forms on input to define a path over which a selected object moves within the 3D space of a scene over time. A path generally comprises control points that indicate positions within the 3D space through which the corresponding object moves. Each control point may further indicate an orientation at the control point (e.g. which way the object should be facing). Each control point may be associated with a specific point in time in a timeline associated with the scene. At any given point in time, for example, an object following the defined path may be either at a control point associated with that time, or at an interpolated position between the control points whose associated time points are closest to the given time.

In some embodiments, the shape of a path between two control points may take a curve or some other complex form. For example, the path may include one or more spline functions or other functions associated with the control points. These function(s) may define, at any given time, a position of the object. Or, when moving the object through control points, content playback software may be configured to calculate a curve that best fits a set of control points rather than simply moving an object in a straight line between each control point. In an embodiment, an object may not necessarily move through a control point at the time associated with the control point, but rather move through a position calculated based on the control point, one or more adjacent control points, and one or more of the associated functions.

In an embodiment, various VR-assisted techniques may simplify the process of defining a path. For example, once a user has selected an object, the user may select a command that initiates path generation input. The user may then begin to move his or her avatar within the 3D space using any suitable input (e.g. walking, running, navigational input, etc.). A path is created that follows the avatar, either literally, or approximately (e.g. by smoothing out the movement). The path comprises various control points selected based on positions through which the avatar moved. These control points may be sampled from the avatar's movements at various predefined increments (e.g. every second, every time the avatar moves a certain distance from a previous control point, etc.), or calculated to fit one or more curve functions or other functions that approximate the avatar's movement. Additionally, or instead, a user may submit certain input that creates a control point while the user is moving the avatar. The user may then submit input that indicates the path is complete to cease defining the path. Subsequently, when playback of the scene is requested, the object selected by the user may move through these control points over time.

In an embodiment, the rate at which the selected object moves through the control points roughly corresponds to the rate at which the avatar moved through the control points. For example, the time associated with a control point may be selected initially based on how long the avatar takes to arrive at the control point.

In an embodiment, a user may create a path for an object by grabbing the object's icon with the avatar's hand and, while continuing to grasp the object's icon (e.g. by making a grasping motion or by holding a grip button), moving the avatar's hand along a path within the 3D space. As above, control points may be created for the path, and the rate of movement may indicate the speed that the object should move along the path.

In an embodiment, a user may create a path by hand-placing icons representing control points at various positions within the 3D space. For example, the user may select a command that initiates a path creation process. The VR environment may optionally depict an icon, such as a bubble having a small representation of the selected object within it, within the hand of the avatar. The user may place the avatar's hand at a specific point in the 3D space and provide some input (e.g. selecting a button, squeezing a trigger, flicking a wrist, etc.) that instructs the VR environment to create a control point. The user may then repeat this process for the next control point in the path, and so on. Optionally, the amount of time between placing control point icons may control the times associated with the corresponding control points. In other words, if it takes a user two seconds between placing a first control point icon and a second control point icon, the object may take two seconds to travel the path segment between the corresponding control points.

Optionally, the VR environment depicts an indicator of some kind at each control point, such as a grid mark, a small cube, a bubble having a small representation of the selected object within it, and so forth. The indicator may indicate various attributes associated with the control point, such as an orientation of the object at that control point, a speed of the object at the control point, other commands associated with the control point, the time associated with the control point, etc. Moreover, there may be indicators placed between control points that indicate, for instance, the shape of the path between the control points, the speed of the object, and so forth. Such intermediate indicators may take the form of, for example, strings, lines, cubes, smaller icons, smaller grid marks, arrows, or any other suitable form.

In an embodiment, a user may define different paths for different objects. For example, a user may select a first object, define a path for that object, select a second object, define a path for the second object, and so forth. These objects may move along their respectively defined paths concurrently with each other, thereby creating a scene involving multiple moving objects. Each object may begin its movement along its respective path at a designated starting time for the scene, or certain objects may begin moving in response to triggers or at designated time offsets relative to the starting time. To simplify path creation, in an embodiment, only nearby paths and/or paths for selected objects may be depicted in the VR environment.

3.7. Path Manipulation Techniques

A user may further manipulate a previously defined path using a variety of inputs. In some embodiments, path manipulation may be accomplished via VR-assisted mechanisms. For example, a user may grab and move control point indicators to different positions using item selection techniques described above, thereby changing the positions of the corresponding control points in the 3D space. As another example, a user may push control point indicators using input indicating a push motion when the avatar's hand is in the vicinity of the control point indicator. The direction that the control point is moved in response to the push may be controlled by the orientation of the avatar's hand relative to the control point indicator, while the distance the control point is moved may be a function of the speed of the pushing motion. As yet another example, a user may manipulate the orientation of the object at a control point by providing input indicating a spinning or twisting motion while the avatar's hand is within the vicinity of the corresponding control point indicator.

In an embodiment, a user may insert or remove control points. For example, by selecting a control point indicator and providing certain input (e.g. pressing an erase button on the avatar's wrist), the user may delete the associated control point. As another example, by placing the avatar's arm within the vicinity of the path and providing certain input, the user may insert a new control point between existing control points within the path. As yet another example, the user may select a command corresponding to an "insert control point" function. The selection of the command may place a disconnected control point indicator within the avatar's hand (e.g. a bubble having a depiction of the object whose path is being defined, an empty bubble, etc.). The user may then place the control point indicator within the vicinity of a path segment to insert a control point between two existing control points that delimit the segment.

Optionally, the user may control the shape of a path between two control points by grabbing an intermediate indicator between the two control points and moving the intermediate indicator. For example, a user may approach a path line with the avatar, grab the path line at a particular point as if a string, and pull the path line in a different direction.

In an embodiment, a user may speed up or slow down the object's movement along a path. For example, while an object is selected, a user may press a button or other control that indicates to speed up or slow down the rate at which the object moves along the entire path. Or, while a control point or intermediate point is selected, the button or control may speed up or slow down the object's movement through the specific point. As another example, a user may grab an intermediate point with the avatar's hand, click on a physical trigger, and twist the trigger one way to increase the speed, while twisting it another to decrease the speed.

In an embodiment, a user may select a segment of a path (e.g. by selecting a first control point, providing certain input, and then selecting a second control point). The user may then change the speed of the object along the path by moving the avatar's hand or the avatar's body at the rate the user wishes the object to move, without necessarily retracing the path. That is, the path remains the same even though the speed associated with that path changes based on the speed of the motion.

In an embodiment, a user may select a control point and press a button or other interface control that indicates that the object is to remain stationary at the control point for a certain amount of time before resuming along the path. For example, the longer the user presses the button, the longer the object may remain stationary.

In an embodiment, a user may play a scene by providing certain input (e.g. pushing up on a motion controller disk). As the scene is playing, the user may pause the scene at any time and manipulate objects, control points, etc. In an embodiment, a user may limit playback of motion for an object by directing the user's avatar to attach start and stop indicators (e.g. bubbles) to control points at which the user wishes to start and stop playback, respectively, in similar manner as described below for attaching animations. In an embodiment, the start and stop indicators may instead or also be used to define a path segment that the user wishes to manipulate.

3.8. Animating Moving Objects

According to an embodiment, a user may define animations for an object as it moves along a path. Animations generally include some sort of manipulation or transformation of the object itself. For example, a bird may begin flapping its wings in a certain manner, moving its eyes, twisting its head, and so forth. Animations may be attached to some or all of the control points of a path.

An animation will be played beginning at the time associated with the control point to which it is attached. The object may continue to move while the animation plays, or the object may pause while the animation is played. An animation may be played continually in a loop (e.g. a bird flapping) or played only once, depending on the animation type and/or user-selected options. Where animations overlap, if the animations are not contradictory (e.g. do not manipulate the same portion of the object), the animations may be played concurrently. Otherwise, various strategies may be utilized to deal with the contradiction, such as immediately ceasing the first animation, ignoring the second animation, or performing a transition between the animations.

In an embodiment, VR-assisted inputs may attach animations to control points. For example, a menu indicating available animations for an object may be displayed using a menu container such as, for example, a rotating disc. The menu may include an indicator icon for each available animation of the select object. The menu may be displayed automatically when the object is selected, or in response to certain input from a user.

The indicator icons for each animation may optionally include a moving preview of the animation applied to the selected object. For example, if the object is a crab and the animation is walking, the indicator icon within the menu may be a bubble in which an animation of a walking crab is played. An animation may be specific to the object. Or, an animation may applicable to multiple objects, and the preview may adjust to the object currently selected. In embodiments with a marketplace, animations may be purchased by themselves, or included with corresponding objects that they animate. The VR environment automatically determines which animations are available and applicable to the selected object, and places them in the menu.

A user may select a desired animation from the menu by selecting its indicator icon using techniques such as described herein. The user may then move the indicator icon for a selected animation to a control point within the path to attach the animation to the control point. If an animation is already defined for the control point, the animation may replace or be added to the already-defined animation, depending on the embodiment and/or the animation type. A separate interface control may allow a user to erase animations for a control point. In some embodiments, an animation may be inserted into a path at a point that is not already a control point, thereby creating a new control point to which the animation is then attached.

In an embodiment, the VR environment includes a "freeze" interface control. For example, such a control may be affixed to the avatar's wrist. Upon selection of the control, the user enters an operational mode whereby the user may point the avatar's hand towards a control point, and select a certain virtual button or physical trigger to "freeze" the control point. Freezing the control point means that the object is required to remain at the control point until any animations or interactions that have been associated with the control point have concluded.

3.9. Integrating Movement with Interactivity

Movements and accompanying animations, in some embodiments, may be integrated with interactive elements within the scene. For example, instead of playing automatically, the movement of an object may only begin when (or if) a certain interaction occurs. Multiple paths and/or animations may be defined for different types of interactions. For example, paths or animations may be defined as nodes of a character interaction graph, such as described subsequently.

In an embodiment, characters or other objects may be associated with awareness rules that indicate one or more actions to perform in response to certain movement-related conditions. Such conditions may include, for instance, the speed of movement, the direction of movement, the current distance to another object (or a specific type of object), environmental conditions such as wind speed or light sources, and so forth. For example, an awareness rule may specify that a character should wave when within a certain proximity of the avatar or another character, or change speeds based on how fast the avatar is moving. More complex awareness rules may be generated with complex conditional logic, such as, if the object passes within a certain distance of the avatar, move the object closer to the avatar and perform some action (e.g. talking, looking at the avatar, etc.), unless also within a certain distance of another object. Such awareness rules may be defined as part of the object definition, or may be attached to objects using techniques such as described with animations (e.g. an awareness rule may be represented by a selectable icon within a container).

In an embodiment, interactions may be attached to control points within a path. For example, a certain interaction may be attached to a control point, at which the object pauses until the interaction occurs. As yet another example, a character interaction graph may be attached to a control point. If the graph branches, different movement paths may branch from the control point for different branches of the character interaction graph.

In an embodiment, the VR environment may provide VR-assisted input mechanisms for attaching interactions to control points within a path. These input mechanisms may be similar to those described above for animations. That is, different graphs may have different indicators, which a user may select and place on a control point.

3.10. VR Training Techniques

Since the exact combination of movements or selected controls needed to perform an editing task may be unknown to a user, in an embodiment, a VR environment may include one or more characters configured to provide assistance to a user. The user may interact with the characters, for example, using voice commands such as "How do I add a new character?" or "How do I change the path of the character?" The assisting character may then demonstrate one or more actions the user should take, along with a specific sequence of those actions, to accomplish the user's objective. Characters may further offer certain help without the help being requested, such as during an initial training period or upon observing that the user appears to be trying, unsuccessfully, to accomplish a certain objective.

Such characters may be termed "digital assistants" or "VR assistants." A digital assistant may be positioned at various positions within the 3D space, and optionally move around in that space. Or, a digital assistant may be requested via various input (e.g. voice command, by looking at the digital assistant on a "shelf" menu that provides access to various content creation tools, etc.).

3.11. Data Storage and Retrieval Techniques

A user may save an arrangement of objects and any paths, animations, or interactions defined for those objects, as scene data either in a local repository or on a cloud-based server. Various input mechanisms may be utilized to provide an instruction to save the scene. For example, in an embodiment, the VR environment may include visual clouds depicted roughly over the avatar's head. By looking up into the cloud, the user may automatically save the scene. Or, the looking into the cloud may launch a menu mechanism whereby the scene may be saved, or a new scene may be loaded or created. In an embodiment, a user may create a new scene from a variety of pre-defined scenes or world spaces.

In an embodiment, different visual clouds may correspond to different functions (e.g. save or load) and/or different storage locations. In an embodiment, a user may pull a cloud down over the user's head to perform a load or save function, or to launch a menu for loading or saving.

In an embodiment, a user may share scenes with other users. A user may load a shared scene from the cloud using any suitable menu system. Certain users may be granted edit permissions for the scene, while others may only view the scene. Users may view and/or interact with certain scenes concurrently and will see each other as different (non-editable) characters within the scene.

In an embodiment with a marketplace, certain characters or other digital assets within a shared scene may only be visible to users that have purchased those assets. A generic substitute asset or "preview" asset may be displayed in place of characters to which a user does not have access. Or, depending on the configuration of the content, the asset may be invisible, or the user may be forbidden to access the content. In yet other embodiments, once a user has purchased an asset, it is visible to all users with whom the asset is shared.

3.12. Character Interaction Graphs

VR content often attempts to approximate the real world (or semi-realistic worlds, fantasy worlds, etc.). In order to maintain a sense of realism and immersion, a VR content creator may desire to create VR characters which inhabit the VR world and interact with the viewer in a realistic manner. For example, a content creator may desire for a VR character to look at a user when the character is approached in a VR environment, to respond to the user's voice when spoken to, to back away when the user invades the character's space, and to notice when the user fails to pay attention to the character. Each of these interactions may be a product of one or more types of input from a viewer (e.g., a direction of the viewer's gaze, one or more physical actions by the viewer, voice input, etc.), from the environment, and/or a current state of the VR character (e.g., the character's position in the VR space relative to other objects, whether the VR character asked the viewer a question, etc.).

In one embodiment, a content development environment 106 enables users to define how VR characters interact with viewers by creating and applying character interaction graphs. At a high level, a character interaction graph comprises a set of interconnected nodes which collectively define how a character responds to various types of input, including input from the viewer, input from the VR environment, and/or information about a current state of the character. In one embodiment, a character interaction graph may include various different node types including, for example, question nodes, decision nodes, interrupt nodes, and action nodes, each described in more detail below.

In one embodiment, a question node may represent a point in VR content where a character initiates an interaction, such as by asking a question (e.g., "Hello, how are you?"), performing an action (e.g., waving hands), or any other action or combination thereof. A question node generally may be triggered at a particular point in time (e.g., at the start of VR content containing the character, at a specified point in time within the VR content, in response to a viewer approaching the character, etc.).

In an embodiment, a decision node represents a point in VR content where a character is expecting or welcoming input from the viewer. For example, if a VR character is configured to ask the viewer a question (e.g., "Do the user want toast, or do the user want eggs?"), then various types of input may be specified at a decision node corresponding to possible responses from the viewer. In the case of a question asked by a VR character, the type of input may be voice input (e.g., indicating that the viewer prefers either toast or eggs). In an embodiment, a content creator can choose what types of input to expect from a viewer (a particular body movement, voice, etc.), and each input parameter specified may be connected to one or more action nodes.

In an embodiment, an action node represents one or more actions to be performed by a VR character. In many cases, an action node may be performed in response to detecting a particular type of input at a decision node. Examples of types of actions that may be performed include, but are not limited to, character dialog, character animation, proceeding to another action node or decision node, etc., and/or combinations thereof.

In an embodiment, an interruption node represents an event which may occur with respect to a character at any time. Examples of an interruption may include, but are not limited to, a viewer invading the personal space of a character, a viewer making contact with the character (e.g., touching, hitting, etc.), the viewer speaking certain phrases (profanity or obscenity spoken by the viewer), etc. An interruption may not fit in a decision chain because an interruption can happen at any time during an interaction. In an embodiment, an interruption node may specify one or more actions for a character to perform in response to detecting an interrupting action, and further specify a next step which may be either: jumping to a specific decision node, repeating the current decision node, returning to a previous decision node, advancing to a next decision node (where the previous, next, and current decision node depends on the current state of the VR character when the interrupt occurred). In an embodiment, an interrupt node may include an option to determine whether and how many times to repeat the interrupt. For example, if the viewer touches a character, the character may be configured to play a particular dialog clip (e.g., "Hey! Stop that!"). However, if the viewer touches the character a couple of times, a different action may be triggered (e.g., the character may walk away and discontinue the interaction).

In an embodiment, the types of input actions which trigger an interruption node may be configured by the content creator and the content development environment 106 can automatically check for conflicts with any decision nodes (e.g., so that the same input action does not trigger a decision node and an interrupt node at the same time).

As indicated above, one aspect of creating a character interaction graph includes configuring character actions based on the various types of viewer input available when a viewer is consuming VR content.

Figure 2:
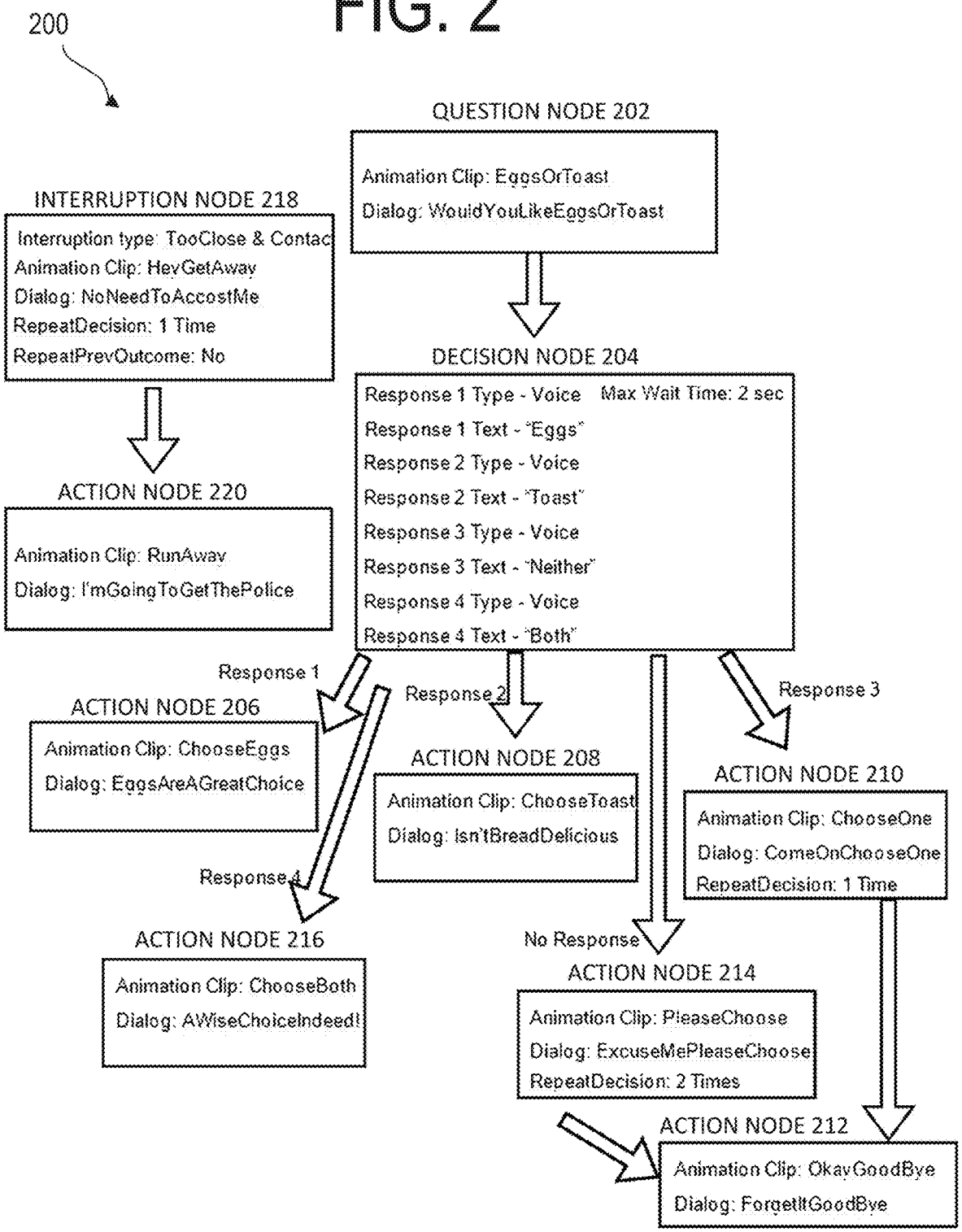
FIG. 2 is an example of a VR character interaction graph, in accordance with one or more embodiments.

FIG. 2 is an example of a VR character interaction graph that defines how a character interacts with a viewer based on various types of viewer input. The VR character interaction graph 200 illustrated in FIG. 2, for example, includes several nodes (including action nodes, decision nodes, and interruption nodes) starting with question node 202. The question node 202 specifies instructions to play an "EggsOrToast" animation clip and to simultaneously play a "WouldYouLikeEggsOrToast" dialog clip. Assuming the interaction path 200 illustrated in FIG. 2 has been applied to or other associated with a particular character in a VR environment, the character may perform the actions specified in question node 202. In one embodiment, the various available animation clip, dialog clips, and other assets may be populated for a particular character, a set of available characters, or based on any other collection.

The question node 202 leads to decision node 204, where the decision node 204 causes the associated VR character to wait for input from the viewer in response to the character actions performed in question node 202. Four different inputs are specified in decision node 204, each input corresponding to a particular voice input (e.g., input corresponding to the viewer speaking the word "eggs", "toast", "neither", or "both"). In other examples, a content creator may also configure hand gestures (e.g., pointing to the eggs or toast in the VR scene), head gestures (e.g., a nod, shake, etc.), or any other type of input as possible response input at decision node 204. Furthermore, multiple different inputs may trigger the same response (e.g., the viewer may answer with the word "eggs", or the viewer may point at displayed eggs).

According to decision node 204, for example, if the viewer provides voice input corresponding to the word "eggs," an action node 206 is triggered because the node is connected to the Response 1 "Eggs" output. The action node 206 indicates that a "ChooseEggs" animation clip is played (e.g., an animation clip in which the VR character hands the eggs to the viewer) simultaneously with an "EggsAreAGreatChoice" dialog clip (e.g., a dialog clip where the VR character verbally confirms that the viewer chose the eggs). This VR character interaction path is now complete.

Returning to decision node 204, if the viewer instead provides voice input corresponding to the word "toast", an action node 208 is triggered because the node is connected to the Response 2 "Toast" output. Similar to action node 206, the action node 208 indicates that a "ChooseToast" animation clip is played simultaneously with an "Isn'tBreadDelicious" dialog clip.

Returning again to decision node 204, if the viewer instead provides voice input corresponding to the word "neither", an action node 210 is triggered because it is connected to the Response 3 "Neither" output. The action node 210 indicates that a "ChooseOne" animation clip is played simultaneously with a "ComeOnChooseOne" dialog clip (e.g., to further solicit a selection from the viewer of one of the options). The outcome node 210 further specifies a "RepeatDecision" parameter of "1 time", indicating that decision node 204 is repeated a single time to allow the viewer to make another choice. If the viewer says "neither" again, the interaction path returns again to outcome node 210.

Because the question has already been repeated one time, the interaction path proceeds to the connected outcome node 212. The outcome node 212 indicates that a "OkayGoodbye" animation clip is played simultaneously with a "ForgetItGoodBye" dialog clip to indicate to the viewer that the interaction with the VR character has ended.

If the viewer does not respond within a specified period of time (e.g., a period of time defined by the "Max Wait Time" value), the interaction path proceeds to the action node 214, where the action node 214 corresponds to the "No Response" input. The decision node 214 indicates that a "PleaseChoose" animation clip is to be played simultaneously with a "ExcuseMePleaseChoose" dialog clip. The outcome node 214 further indicates that decision node 204 may be repeated up to two times (e.g., as indicated by the "RepeatDecision" value of 2). If the viewer fails to respond twice, the interaction path proceeds to the connected outcome node 212. As illustrated by action nodes 210, 212, 214, action nodes can be chained, where multiple actions can be triggered one after the other.

As described above, a character interaction graph may include one or more interruption nodes, where each interruption node may be triggered outside of a question-decision-outcome node path because the viewer may perform the interrupting action at any point during the viewer's interaction with a character. In the example above, an interruption node 216 is linked to a "TooClose" interruption type (e.g., corresponding to the viewer standing in close proximity to the corresponding character), and a "Contact" interruption type (e.g., corresponding to the viewer touching the character). If either of these interruption types is detected at any point during execution of the interaction graph, the interruption node 216 indicates that a "HeyGetAway" animation clip is to be played simultaneously with a "NoNeedToAccostMe" dialog clip.

The interruption node 216 further specifies a "RepeatDecision" parameter of 1, indicating that if a current decision node is in progress, the decision node is to repeat. Other possible values that may be set for an interruption node are to indicate whether to skip to the next decision node in response to detecting the specified interruption, or to repeat the previous decision node in response to detecting the specified interruption. The interruption node 216 further specifies a "RepeatPrevOutcome" parameter of "No," indicating that the interaction path is not to replay the animation clip and/or dialog clip from the previous outcome node (e.g., the one upstream from the current decision node). If the "RepeatPrevOutcome" parameter is set to "Yes," the interaction path is to repeat the dialog clip and/or animation clip specified in the upstream outcome node relative to a current decision node.

If the interruption node 216 is triggered more than once (exceeds the "RepeatDecision" parameter value of 1), then the outcome node 218 connected to the interruption node 216 is triggered. In the example of FIG. 2, the outcome node 218 indicates that a "RunAway" animation clip is to be played simultaneously with a "I'mGoingToGetThePolice" dialog clip.

After an interruption path completes, any current decision node is still active so the viewer can continue to engage with the VR character when the interruption path is completed. The example of FIG. 2 illustrates a scripted interaction example, where a storyteller may predefine narrative paths triggered by particular viewer actions. In other examples, AI components may be used where the outcomes are generated procedurally, and the decisions are run dynamically. In this case, the AI calls the underlying character interaction API and become a standalone AI module in the content development environment.

FIG. 2 illustrates a high level example of a VR character interaction graph and how the graph relates to a character's interactions with a viewer of VR content. To facilitate the creation of VR character interaction graphs, in one embodiment, a content development environment 106 may provide one or more graphical user interfaces that enable content creators to create and edit character interaction graphs. For example, the graphical user interfaces may enable users to create interaction graph nodes, connect the nodes to one another as appropriate, specify various animations, dialog, and other types of character actions to be performed at particular nodes, and to apply created interaction graphs to one or more particular characters.

Figure 3:
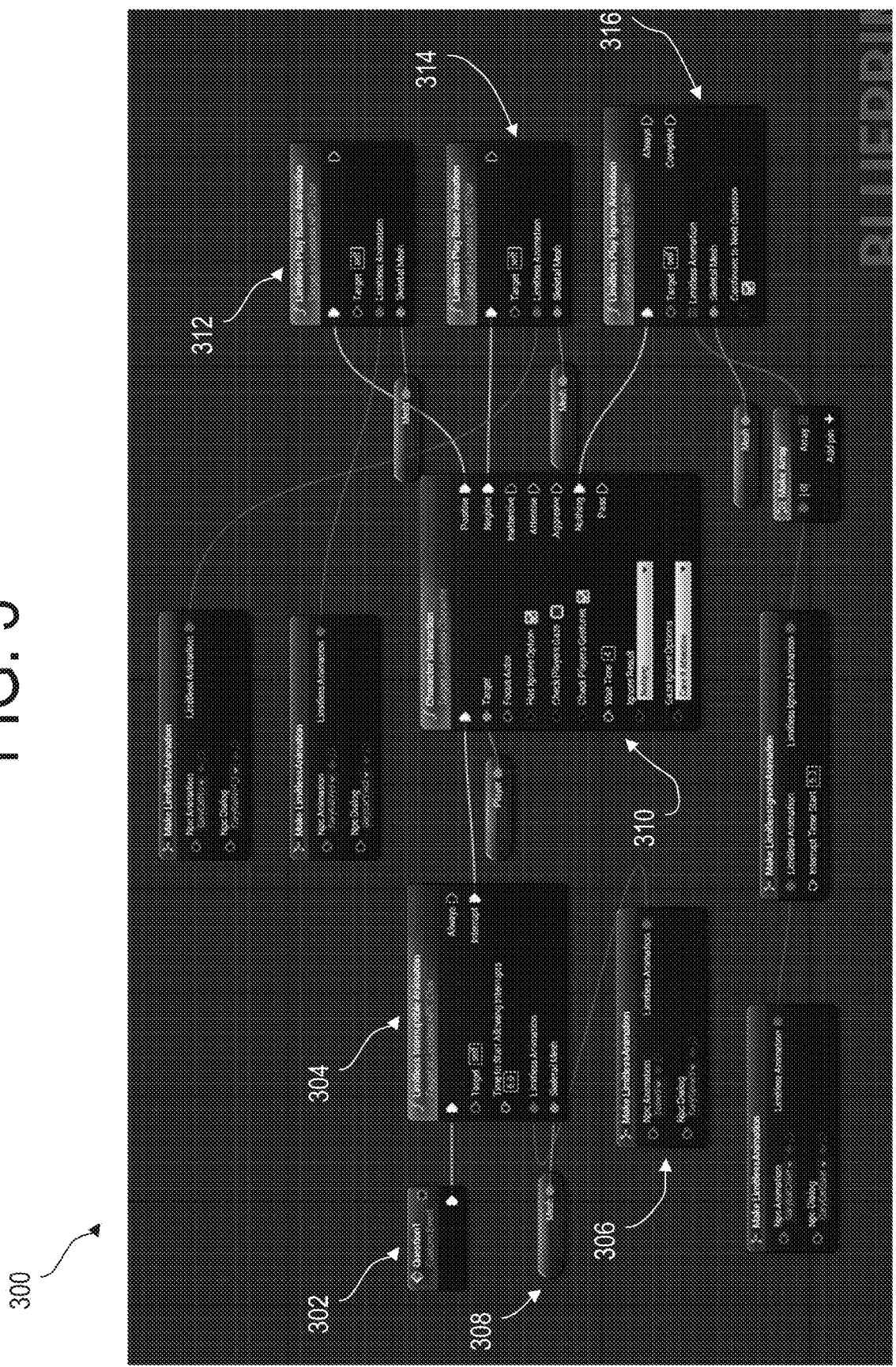
FIG. 3 is an example of a VR character interaction graph designer interface, in accordance with one or more embodiments.

FIG. 3 is an example of a graphical user interface for creating VR character interaction graphs. For example, interaction graph 300 may represent a graph under construction by a content creator for a particular character. Although the example in FIG. 3 illustrates a two dimensional display that may be displayed on a flat screen, for example, other examples may include similar interfaces for creating interaction graphs in a VR environment. For example, a content creator may use one or more VR devices to manipulate the nodes and connections of the graph in a three dimensional VR environment.

In the example graph 300 of FIG. 3, the interaction graph may begin with the question node 302 (labeled "Question1" on the left side of the graph). As described above, a question generally may correspond to any action by a character that initiates an interaction with the viewer, including a verbal question, one or more body actions (e.g., extending the character's arm to shake hands), or any other type of cue. The example question node 302 proceeds to the action node 304, which corresponds to one or more character actions configured to initiate the interaction. In this example, action node 304 is configured to play the animation and dialog specified by the connected action node 306.

In one embodiment, various nodes of a character interaction graph, such as graph 300, may be associated with a particular VR character. For example, action node 304 is connected to a character node 308, which specifies a particular character (labeled "Mesh") that is to perform the one or more actions specified by the action node 304.

The action node 304 proceeds to the decision node 310, which specifies a set of possible inputs from the viewer for continuing the interaction. In the example of FIG. 3, the decision node 310 includes several checkboxes to indicate what types of viewer input are of interest (e.g., where the viewer is gazing, what voice input the viewer provides, etc.) The decision node 310 of FIG. 3, for example, the "Check Player's Gaze" box is unchecked indicating that the content creator may not be interested in the viewer's gaze; however, the content creator instead may be interested in the viewer's gestures (e.g. whether the viewer nods or shakes his or her head), so the "Check Player's Gestures" box is checked. Other example input options for decision node 310 include an "Has Ignore Option", the option indicating whether the content creator desires the character to perform some action if the viewer does not respond within a specified time period (e.g., indicated by the "Wait Time" option).

The action node 310 includes several connections to other nodes depending on a particular input received from the viewer. For example, if the viewer's response is positive (e.g., if the viewer nods his or her head up and down), the interaction graph proceeds to action node 312. Action node 312, for example, specifies that the character "Mesh" is to play a particular animation clip simultaneously with a particular dialog clip. Similarly, if the viewer's response is negative (e.g., if the viewer shakes his or her head sideways), the interaction graph proceeds to action node 314, where a different animation clip and dialog clip may be played simultaneously.

Action node 312 further includes a connection for the case that no matching input is received (e.g. if the viewer does not nod his or her head within the specified amount of time), where the "Nothing" connection leads to an action node 316. Action node 316 specifies another particular animation clip and dialog clip, and includes options to cause the character to repeat the previous question, proceed to a next question, or perform another action.

As illustrated in FIG. 3, an interaction graph enables content creators to intuitively design the way in which a VR character interacts with a viewer, including the character's responses to the different ways in which a viewer may interact with the character. These processes enable the content creator to create an immersive experience with the characters in ways not currently possible.

Figure 4:
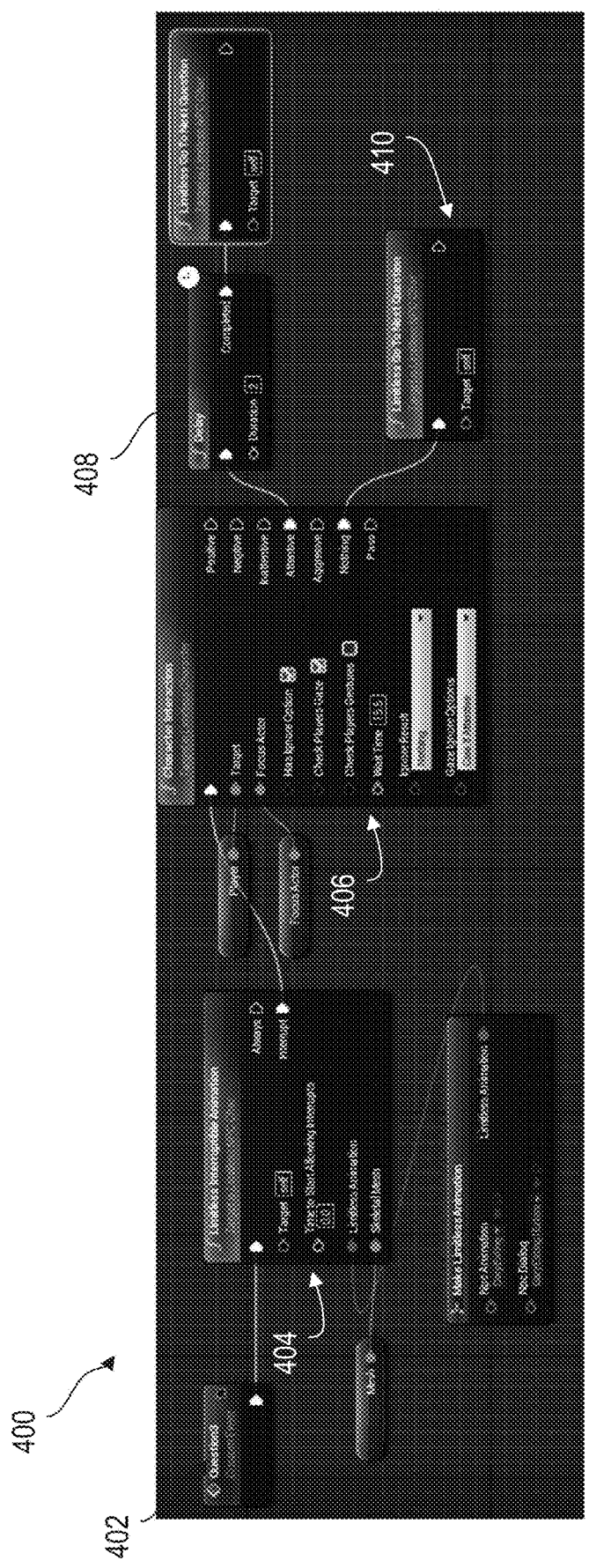
FIG. 4 is another example of a VR character interaction graph designer interface, in accordance with one or more embodiments.

FIG. 4 is another example of a graphical user interface for creating a VR character interaction graph. Similar to FIG. 3, the interaction graph 400 may begin with the question node 402 (labeled "Question3"). Question node 402 proceeds to the action node 404, which specifies a particular animation clip and dialog clip to be performed by the character labeled "Mesh".

Action node 404 proceeds to decision node 406. In this example, the decision node 406 includes a checked checkbox for "Check Player's Gaze", indicating that the content creator is interested in where the viewer is looking in response to the character action performed by action node 404. For example, the action node 404 may cause a VR character to invite the viewer to look over in a particular direction, and the character may wait to see if the viewer looks in the requested direction before triggering additional animations and/or dialog. Following this example, decision node 406 includes a connection for the input "Attentive" (e.g., meaning that the viewer's gaze is focused on the character) to action node 408. Action node 408, for example, specifies that the character waits two (2) seconds and then proceeds to a next question. If the viewer does nothing (e.g., meaning the viewer does not focus on the character in response to action node 404), the character may also proceed to a next question according to action node 410. In other examples, other actions may be specified in response to the viewer responding positively, negatively, inattentively (e.g., meaning the viewer looks in a different direction than requested by the character), aggressively, etc., where each response has a defined input pattern.

Figure 5:
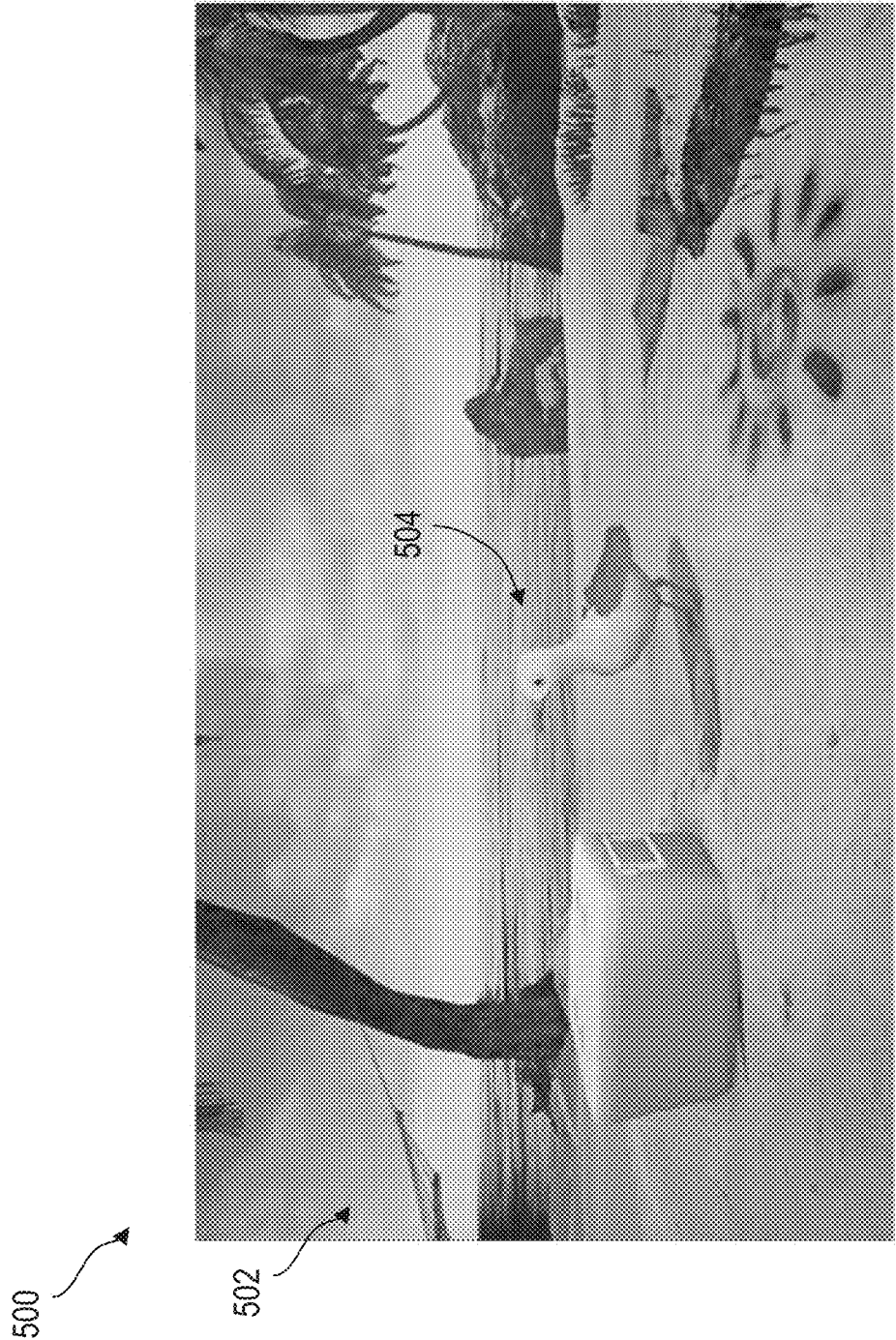
FIG. 5 is an example screenshot of a scene including a VR character to which a VR character interaction graph may be applied, in accordance with one or more embodiments.

FIG. 5 is an example screenshot of a scene from a VR content item including a VR character to which a character interaction graph may be applied. The scene of FIG. 5, for example, includes an VR environment 502 and a character 504 (a seagull standing on a beach). The scene 500 may be a part of an interactive VR movie, video game, or other type of content.

In one example, character 504 may be configured to initiate the interaction with an action (e.g., based on one or more action nodes, the character may look at the viewer and say "Hi"). The character 504 may then wait for input from the viewer (e.g., based on various types of input defined by a decision node of an interaction graph). If the viewer responds with a particular voice input (e.g., the viewer says "Hi" back to the character), the character 504 may then perform one or more additional actions based on one or more corresponding action nodes. The interaction between the viewer and character 504 may then proceed according to an interaction graph applied to the character 504.

3.13. Standard Character APIs

In one embodiment, a content development environment 106 may include a standard character API module 112, including one or more APIs for standardizing the process of creating VR characters. Among other benefits, the ability to standardize the creation of VR characters may enable content creators to more easily use VR characters across different VR content, share other types of digital assets (e.g., accessories, textures, animations, etc.), and apply VR character interaction graphs to different types of characters.

In general, current processes for creating digital characters (e.g., digital characters created for games, film, visual effects, etc.) often are highly nonstandard. For example, animation created for one digital character rarely works on another character (even another character with similar face and body structures) without difficult rework, animation controls can vary widely, and the fundamental technical structure is highly variable. These issues may often arise even when characters are authored in the same 3D software package. In addition, technical requirements to integrate characters into a project or pipeline can vary wildly from one project to another and from one entertainment company to another, which further increases costs and requires specialized talent.

In one embodiment, characters created using a standard character API module 112 may enable applications to introspect various attributes and aspects of characters. For example, a third-party application (e.g., a VR movie) interacting with a character created using a standard character API can request information about the character (e.g., where are the character's eyes located? what direction are the character's eyes looking? what color are the character's eyes?). With this information, the third-party application can then apply an appropriate texture or other modification to the character's eyes. Other examples may use any other aspect of a character (e.g., location and presence of body parts, animations, audio information, etc.), and perform any other type of modification to the character.

As another example, a third-party application (e.g., a VR game) can send a request to a standard character API to determine which characters are present in a particular environment. The application may further be able to determine various attributes of the characters present such as, for example, whether the characters are friendly or mean, what accessories the characters have with them, etc. Based on these types of determinations, a VR content application can apply the appropriate animations to a particular character (e.g., play a "scared" animation for a character if several "mean" characters are nearby).

In one embodiment, a standard character API module 112 may include a set of APIs for defining a consistent standard for characters, which allows character, character animation, and character asset sharing in ways that do not currently exist. In one embodiment, the set of APIs may include one or more character metadata APIs, module rig APIs, character surfacing APIs, character animation APIs, animation control APIs, and artificial intelligence (AI) APIs, each described in more detail hereinafter.

In an embodiment, one or more character metadata APIs may enable applications to obtain metadata related to a character's structure and design. The metadata that is available for characters, for example, may enable more intelligent sharing of assets (e.g., animations for characters), allow third-party plugins a way to configure themselves to the character automatically, and other features.

In an embodiment, one or more modular rig APIs may enable applications to break up a character's bone and face muscle structure into subparts, which can be authored and configured independently, using character metadata to self-configure themselves.

In an embodiment, one or more character surfacing APIs may enable applications to obtain surface data about a character. The surface data may be used, for example, by third party applications to apply surface and/or texture details with minimal to no user input or configuration.

In an embodiment, one or more character animation APIs may provide functionality to apply animation authored for one character to another character, both when the characters have the same general structure (e.g. applying animation created for one biped character to another separately created biped character) and of dissimilar structures (e.g., applying animation created for a biped character to a quadruped character, for a quadruped character to a biped character, for a human character to a robot character, etc.). The ability to apply animation details across characters may include face animations, body animations, and any other types of character animation.

In an embodiment, one or more animation control APIs may provide functionality to build and expose consistent controls to a content creator, enabling consistency from character to character even when the structure or anatomy is dissimilar between two different characters. This may include controls, for example, for procedural animation such as secondary motion, skin, muscle, and/or fat simulation, hair simulation, cloth simulation, etc.

In an embodiment, a standard character API module 112 may include one or more artificial intelligence (AI) APIs. An AI API, for example, may provide various interfaces that enable AI agents in VR applications to control characters, integrating with animation control APIs.

3.14. Cloud-Based Content Creation

In an embodiment, a content development environment 106 may include a cloud computing module 114, where the cloud computing module provides various cloud computing resources configured to implement various functionality of the content development environment 106. By enabling various aspects of the system to be implemented and hosted in the cloud, local VR devices can offload computing and storage-intensive processes to the cloud. Furthermore, hosting aspects of the content development environment 106 in the cloud may enable other types of functionality, including content control, dynamic updates to VR content, dynamic customizations, among other features.

In one embodiment, cloud computing resources may be used to host VR content (e.g., character data, character animation data, character assets, etc.) created by various content creators on the cloud, and may further handle processing for aspects of VR content creation and playback on the cloud (e.g., creating characters, interaction graphs, character animations, and other content). Other example types of processing that may be performed using cloud-based services include voice recognition, AI, and other computationally intensive operations, such as lighting and rendering.

In one embodiment, various characters, animations, and character assets (clothes, accessories, etc.) may be hosted using cloud-based services. By hosting the characters, animations, and character assets in the cloud, these items may be streamed on-demand to individual VR applications. Further, the cloud-based services may include a cloud-based marketplace that enables content creators to upload characters, animations, character assets, etc., and to share the items with other content creators (either free or for a fee). The other content creators may access the shared items using various APIs during the content creation process. For example, a character accessory representing a hat stored in the cloud might use a character metadata API to determine where to attach itself to a particular character. As another example, a face animation stored in the cloud may use a character animation APIs to apply the face animation to a character other than the character which the animation was originally created. As yet another example, a character asset representing a type of fabric (e.g., leather) may use a character surfacing API to create a jacket with a particular design (e.g., a leather jacket).

In an embodiment, characters may be hosted on the cloud and streamed to client VR devices at runtime. For example, when a viewer executes a particular VR content, characters included in the content, any accessories for the characters (clothing, hats, etc.), and associated animations may be streamed from the cloud to the client device at runtime. The ability to stream these types of items and others from the cloud at runtime may enable significant savings at the VR device in terms of computing resources, disk space, and/or memory usage.

In an embodiment, the ability to stream items from the cloud further enables dynamically changing which assets (e.g., animations, accessories, characters, etc.) are delivered to the application each time the VR content is accessed. This may be used, for example, to enable a viewer to choose which character of several possible characters appears in certain aspects of a VR content experience. For example, a particular VR content may allow a viewer to choose which celebrity from a set of celebrities the viewer desires to interact with. The ability to select different celebrities may be a free selection, or the ability to access other celebrities may be purchased by the viewer via a micro-transaction. Content creators can create their own characters, garments, character accessories (or customize existing ones), and host the items on the cloud marketplace, thereby making them available to share or sell to content creators and/or VR content viewers.

In an embodiment, the ability to stream items from the cloud may enable VR content to include dynamic decisions about which response from a set of responses the character uses in response to particular input, and the appropriate animation and/or dialog can be streamed dynamically to the VR character in response. The ability to dynamically stream animations and/or dialog to particular VR characters may further enable content creators to add new animations and/or responses over time and after the VR content initially is delivered to viewer devices.

In general, the ability to dynamically stream characters, character assets, animations, and other items from the cloud enables control over access server side. By controlling the server side, content creators can easily add new customization options by tagging a marketplace item as available for that app, and it instantly appears as an option for the viewer, without a patch required for the application.

In one embodiment, third parties can host VR items in the cloud and provide controlled access to the items within various VR content. For example, a celebrity may create and host a VR character likeness (e.g., including a character, animations, items, dialog, etc.) on the cloud and enable VR content creators to license the character likeness for use in VR content. Because the hosted VR content items are streamed at runtime when the VR content is viewed, the celebrity can control which apps get permission to use it, which accessories/clothing/animation can be applied, etc., and change these permissions over time. As another example, product companies may create VR accessories for use in VR content (e.g., a Vera Wong dress, a Prada handbag, etc.).

In one embodiment, cloud computing resources may be used to offload character and/or scene processing to the cloud, allowing VR content creators to create more processing intensive content while maintaining a high refresh rate (e.g., a 90 Hz refresh rate is a generally accepted minimum for VR content). Example types of processing that may be managed in the cloud include voice processing, AI processing, deformation, rendering, lighting calculations for characters and/or character assets. Furthermore, because the cloud-based processing results are streamed to client VR devices, support for multiple platforms (e.g., PC, various game consoles, mobile devices, etc.) can be more easily achieved.

In one embodiment, by enabling content creators to build VR experiences with components hosted in the cloud, many types of metadata may be provided about the entire application as viewers interact with the content. For example, the cloud may be used to track and store various analytics (e.g., how long did viewers engage with the content, what aspects of the VR content did viewers look at most frequently, how did viewers interact with the VR content and content assets, what aspects of the VR content did viewers not interact with, etc.). This information may be highly valuable to content creators to help determine what aspects of the content are most engaging to viewers.

3.15. Other Development Environment Features

In one embodiment, a content development environment 106 may include one or more templates for building characters. For example, the templates may be based on best practices in the VR, computer animation, and other related fields.

In an embodiment, a content development environment 106 may include one or more interfaces that enable content creators to add internal bones and/or animation controls with point-and-touch in VR. The interfaces may further automatically setup rigging by applying a modular rig that automatically communicates and connects itself to the other modular rigs (e.g., a foot rig may automatically sense and connect to a leg rig so that movement of the character's foot automatically adjusts knee and other joints). This may be for body and face, for bipeds and non-bipeds. The modular rig further may include an API which third-party developers can extend (e.g., build a wing rig for a bird).

In one embodiment, a content development environment 106 may include character deformation technology in the character development tools. The deformation technology may enable content creators the ability to create fluid movement, realistic face animation, and believable skin/muscle movement as the character is designed. The character deformation technology may include built-in surface deformers, repulsors, delta mush, etc. In an embodiment, the environment 106 may enable creators to create attach points so accessories and other assets can determine where to attach to a character, for example, based on metadata about the character available from a standard character API.

In an embodiment, a content development environment 106 may enable content creators to build character rigging in layers, e.g., based on a base bone layer, a fat/muscle layer, a skin layer, etc., so that various layers can be disabled when beneficial for performance reasons, without making the character look wrong or forcing the viewer to rebuild it for a lower performance profile.

In an embodiment, a cloud computing module 114 may include controls to ensure that a character conforms to one or more standard character APIs, and provide drag-and-touch access to components on the marketplace that integrate into the character itself.

In one embodiment, a content development environment 106 may include one or more interfaces that enable content creators to build character clothing and accessories. The interfaces may enable the creation of clothing and accessories using interfaces provided by the environment 106 and/or third-party plugins.

In an embodiment, the content development environment 106 may include one or more components that enable content creators to assemble VR environments, sets, lights, etc., so that content creators can create an entire VR experience in the same environment with the character creation.

4.0. Example Implementations 4.1. Illustrations of Example Development Environment FIGS. 8-16 illustrate the appearance of an example VR-assisted content development environment in which certain described techniques may be practiced, according to an embodiment. FIGS. 8-16 are two-dimensional renderings of the example environment, as it may appear to a user (e.g. through an avatar's viewport displayed by a VR headset and looking out into the simulated 3D space at a direction corresponding to the current orientation of the avatar). The illustrated techniques and features are examples of techniques and features that may be implemented, depending on the embodiment. Not all environments may implement the same features and techniques, and yet other features and techniques described herein may be implemented in other embodiments.

Figure 8:
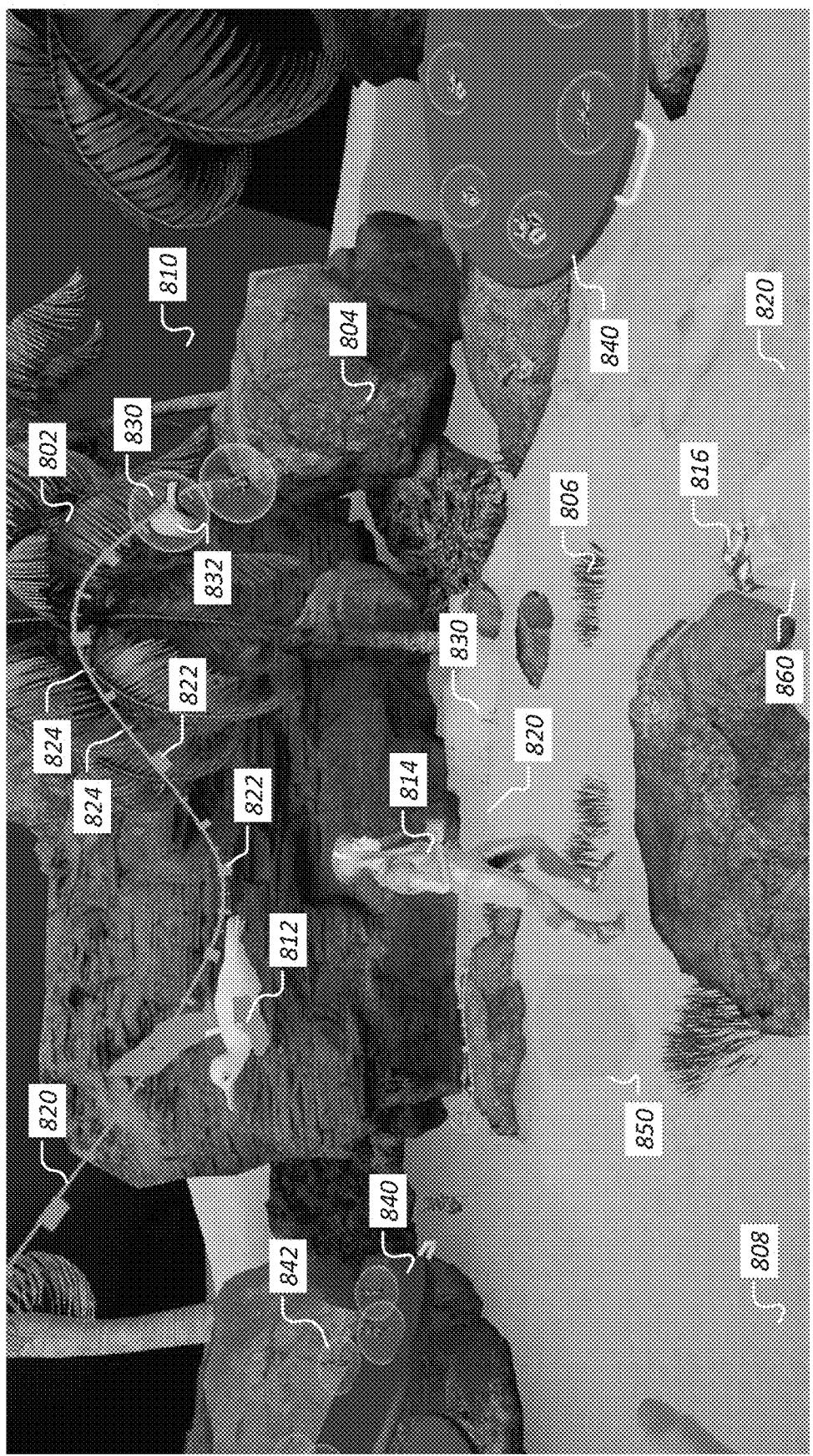
FIG. 8 illustrates, among other aspects, visual representations of a number of different objects and corresponding object paths positioned within a 3D space.

FIG. 8 illustrates, among other aspects, visual representations of a number of different objects and corresponding object paths positioned within a 3D space portrayed by a viewport 800. The 3D space includes visual representations of a variety of fixed (non-editable objects), such as trees 802, rocks 804, fauna 806, sand 808, and sky 810, that serve as a backdrop for the scene being created. Meanwhile, the 3D space also includes editable objects, including a bird object 812, a female human character object 814, and a crab object 816.

Each editable object's visual representation is positioned in the middle of a path 820 that is traversed by the object in the 3D space over time. The path 820 is a series of control points, indicated by large grid mark indicators 822, connected by a curving line. Intermediate control points 824 are also depicted using smaller grid marks. In the depicted embodiment, control points are placed at specific time intervals in the object's path 820. Hence, a greater distance between a set of control points indicates that the object will move through those control points more quickly than a set of control points that are closer together.

Bubbles 830 are attached to certain control points. The bubbles 830 correspond to animations that may be played, beginning at those control points, while the corresponding objects are moving. Inside of the bubble 830 is some indicator 832 of the animation to be played. This indicator may itself be animated. Two turntables 840 are visible on the left and right of the viewport 800, respectively. These turntables may be in fixed positions within the 3D space, or at positions that are relative to corresponding characters or objects within the viewport 800. The turntables 840 represent menus of animations that may be attached to control points. Each turntable 840 may comprise animations 842 that are available for a different object or set of objects within the scene. Each animation is depicted as a bubble, in similar manner to the animations already attached to the paths.

A cube 850 next to the left of the human character object represents a movable teleport point within the scene.

The avatar's left thumb 860, which is part of the avatar's left hand, is visible in the bottom left corner of the viewport. The user may control the position of the left thumb using any of a variety of input mechanisms, including motion detection techniques with respect to the user's left hand.

Figure 9:
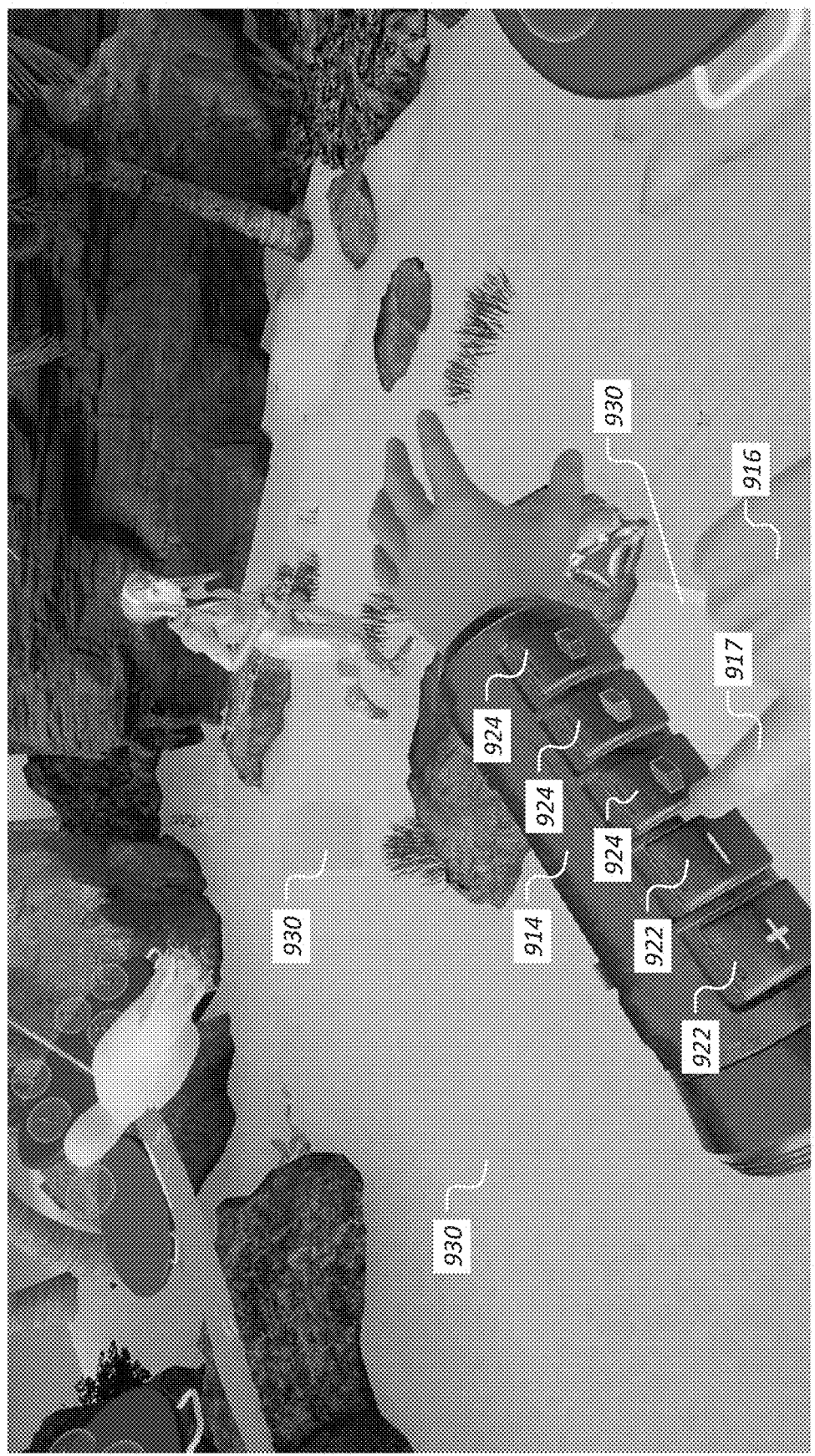
FIG. 9 illustrates, among other aspects, the use of navigational controls affixed to the arm of the user's avatar.

FIG. 9 illustrates, among other aspects, the use of navigational controls affixed to the arm 914 of the user's avatar. In FIG. 9, the perspective of the viewport 900 of the user has changed slightly relative to FIG. 8 on account of movement of the avatar (e.g. on account of the detecting walking movement by the user). The avatar's left arm 914 has been moved up and into the center of the viewport (e.g. on account of the detecting that the user has moved the user's left arm). Five navigation controls are depicted on the arm, including two zooms controls 922 and three teleport controls 924. Each teleport control 924 corresponds to a different cube 930 in the 3D space, all of which can now be seen in the viewport 900. The avatar's right hand 916, with an extended pointer finger 917, is also now visible in the viewport (e.g. on account of the user making an analogous movement with the user's right hand). The user may press one of these buttons 922/924 to navigate through the 3D space, as explained in other sections.

Figure 10:
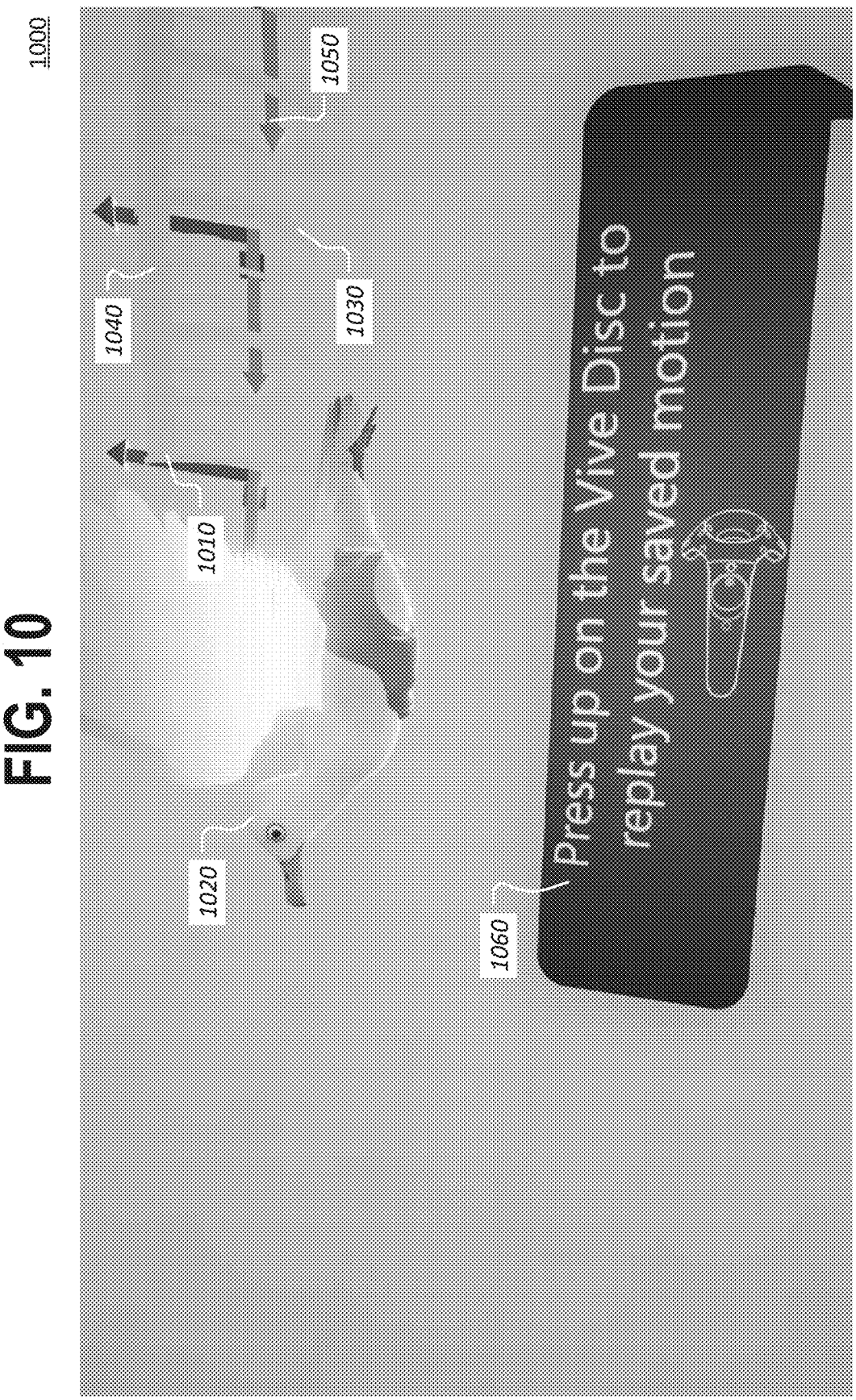
FIG. 10 illustrates, among other aspects, a zoomed-in view of a path of an object.

FIG. 10 illustrates, among other aspects, a zoomed-in view of a path 1010 of an object 1020. The path includes grid mark indicators 1030 and a line 1040, as before, but also includes directional indicators 1050 the orientation of the bird object 1020. The bird object 1020 is shown at the end of the path on account of a user's request to play the motion indicated by the path. As indicated by the visible instructions 1060, a specific input may instruct the VR environment to replay this motion.

Figure 11:
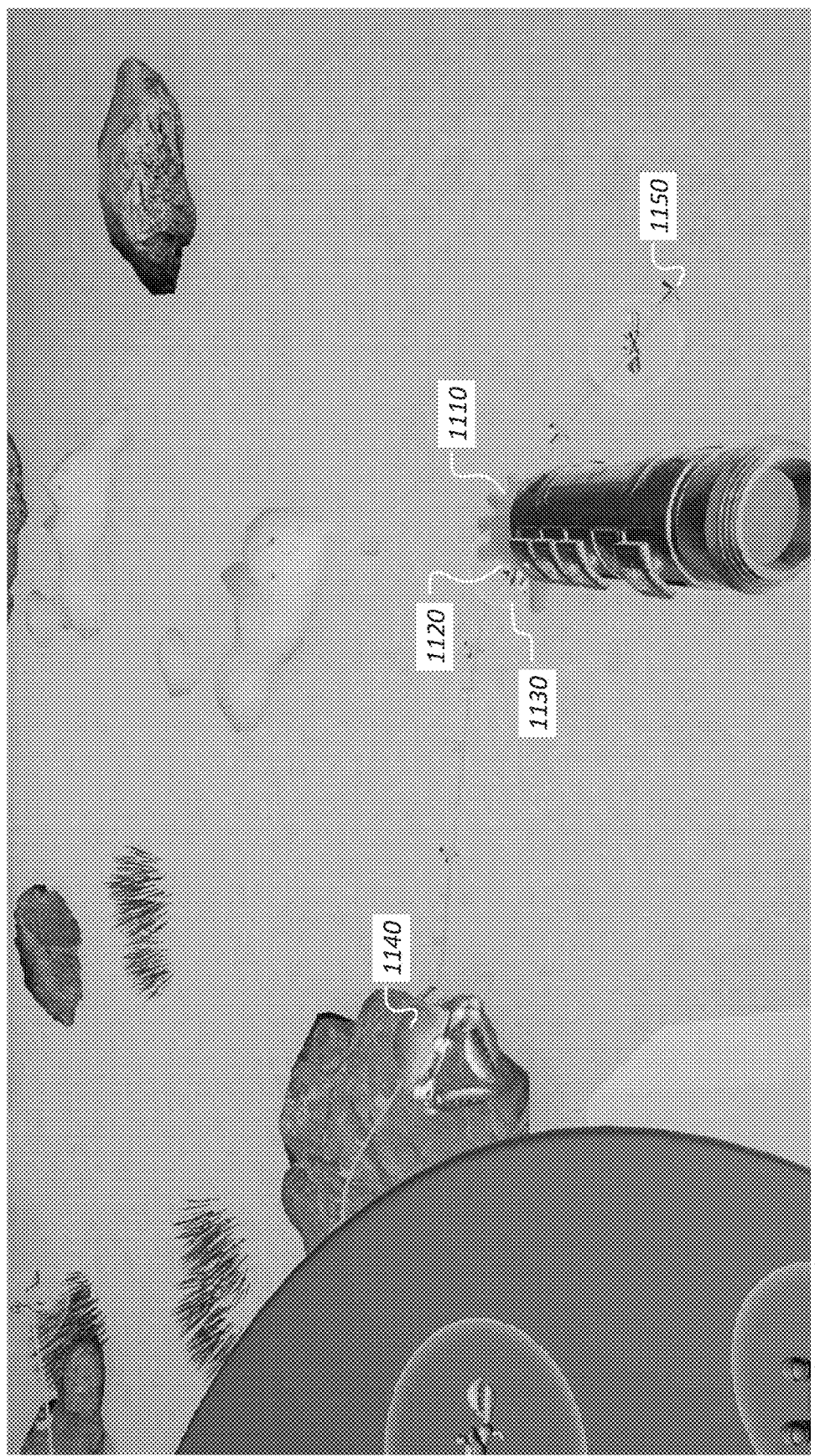
FIG. 11 illustrates, among other aspects, a VR-assisted input mechanism for manipulating existing control points in a path of an object.

FIG. 11 illustrates, among other aspects, a VR-assisted input mechanism for manipulating existing control points in a path 1150 of an object 1140. The viewport 1100 is again changed relative to FIGS. 8 and 9, on account of movement of the user and/or the user looking down towards the ground. The avatar's right hand 1110 is now visible in the viewport 1100, on account of input from the user, and moving a control point 1120 (which happens to have an attached bubble 1130) from one position to another, thereby changing the path 1150 of the crab object 1140.

Figure 12:
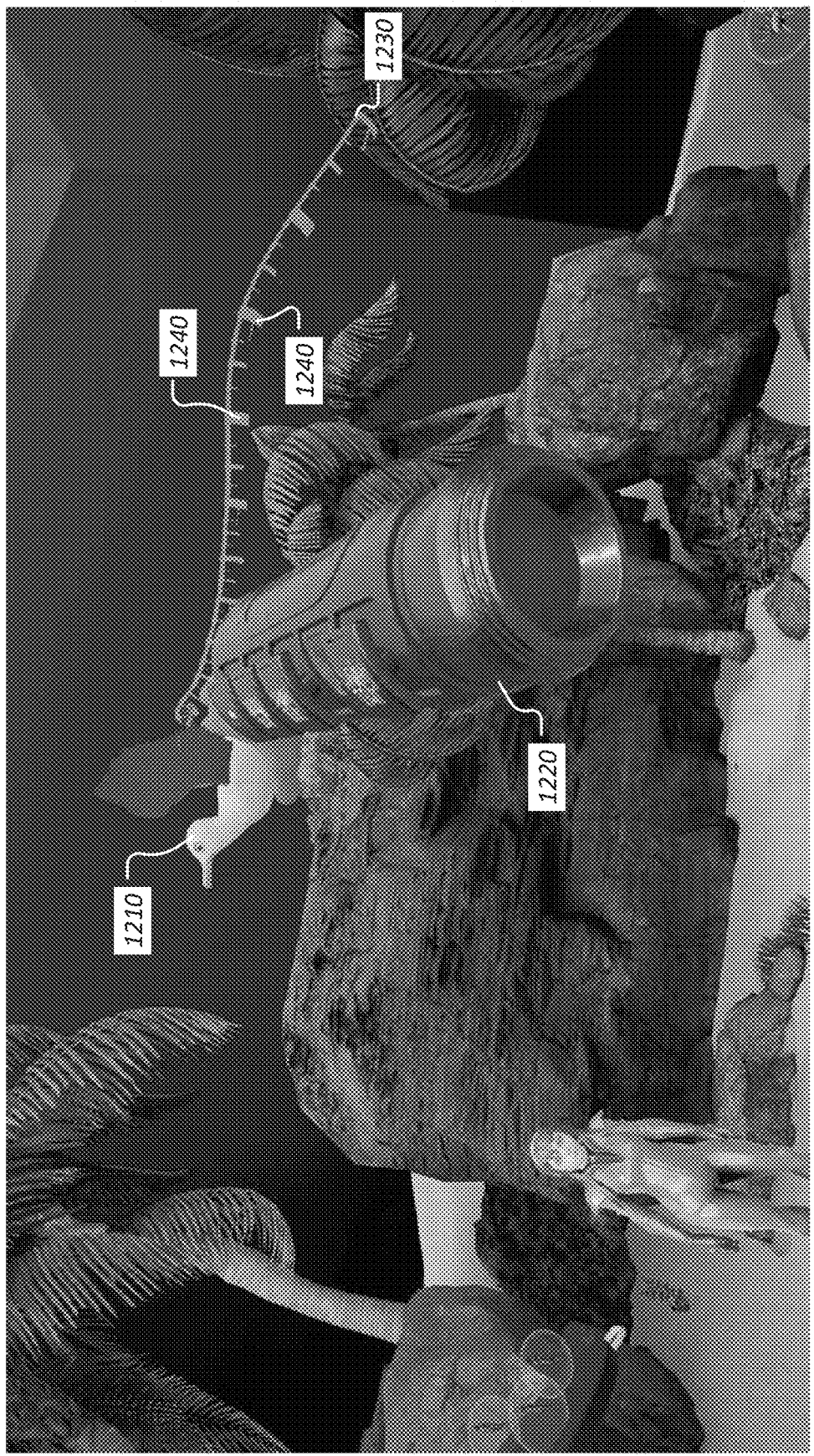
FIG. 12 illustrates, among other aspects, a VR-assisted input mechanism for defining a path of an object.

FIG. 12 illustrates, among other aspects, a VR-assisted input mechanism for defining a path of an object. The viewport 1200 is again changed, this time looking up towards the sky. The user had "grabbed" the bird object 1210 using input that controls the right arm 1220 and hand of the avatar. The user is moving the bird 1210 from the right of the viewport to the left of the viewport upon a path 1230 having control points 1240 that trail the bird.

Figure 13:
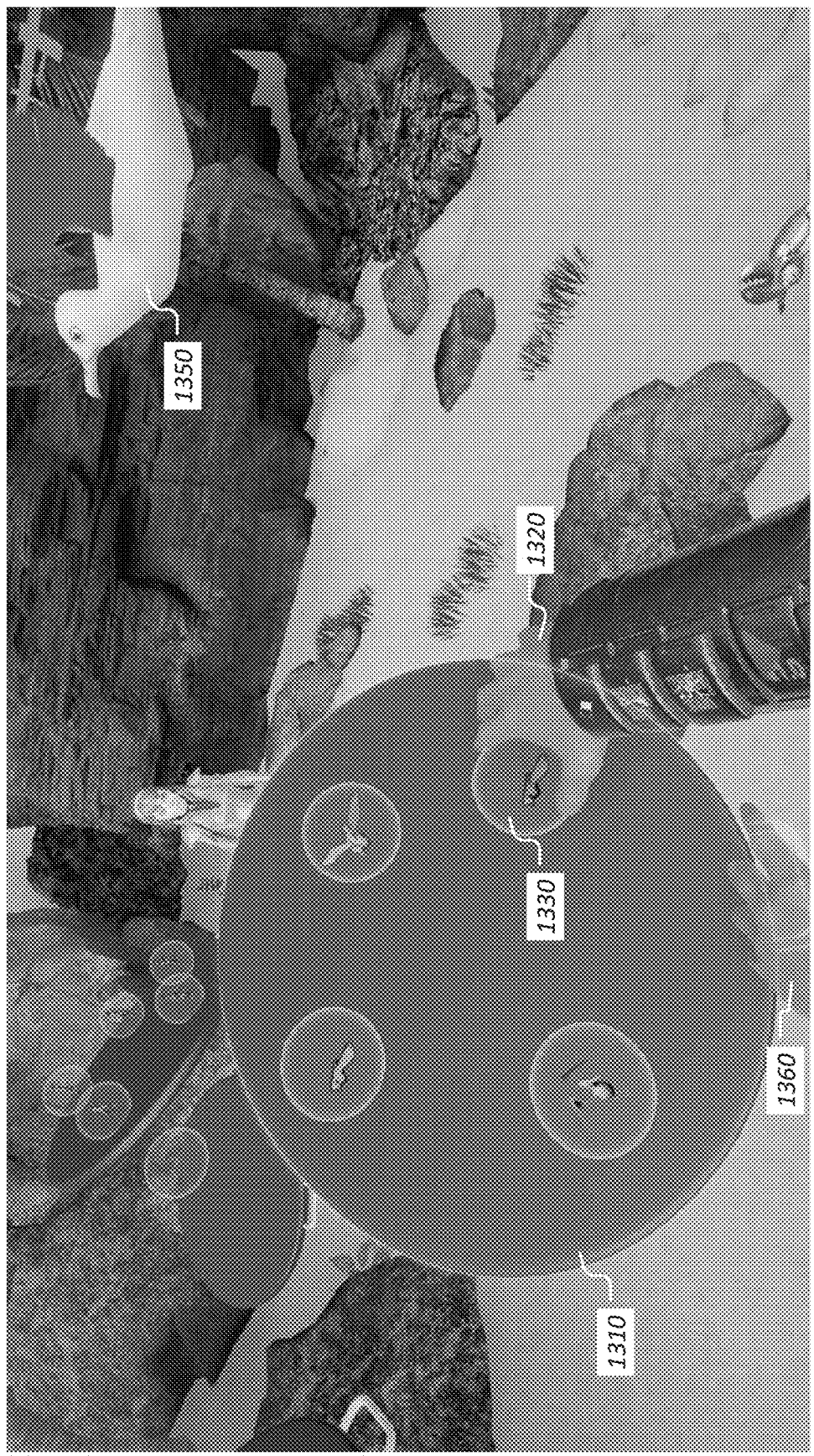
FIG. 13 illustrates, among other aspects, the use of a turntable wheel to select options in a VR environment.

FIG. 13 illustrates, among other aspects, the use of a turntable wheel 1310 to select options in a VR environment. As depicted in viewport 1300, the avatar's right hand 1320 is currently reaching out and grabbing a bubble 1330 corresponding one of four animations that are available from an animation menu/turntable 1310 for the bird object 1350. Note that the avatar's left hand 1360 is also touching the wheel 1310. The left hand 1360 has just spun the wheel 1310 to place the currently selected bubble 1330 within convenient reach of the avatar's right hand 1320.

Figure 14:
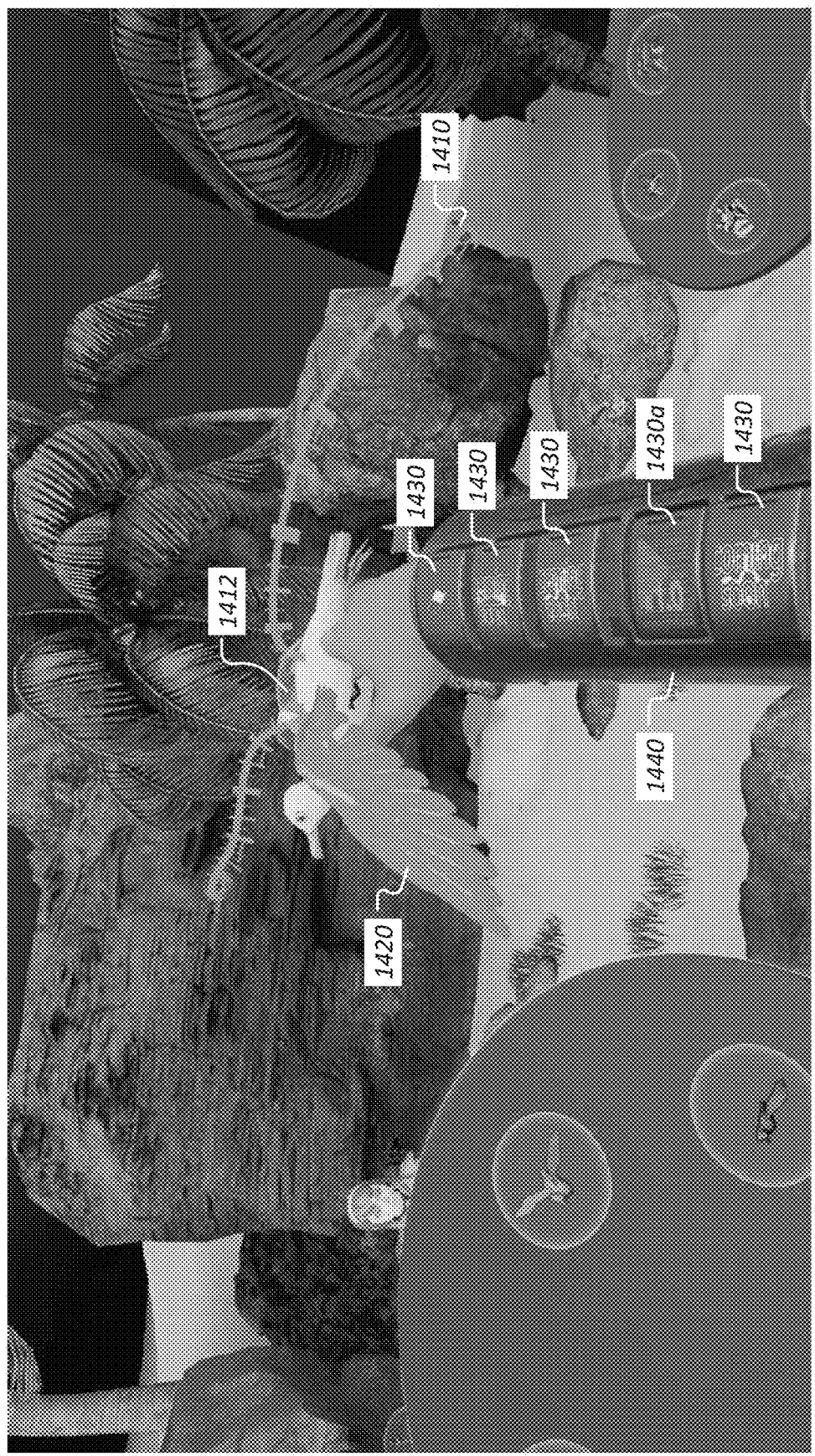
FIG. 14 illustrates, among other aspects, a VR-assisted input mechanism for adding an animation to a path of an object.

FIG. 14 illustrates, among other aspects, a VR-assisted input mechanism for adding an animation to a path 1410 of an object 1420. As depicted in viewport 1400, the bubble selected in FIG. 13 has now been carried and released at a particular control point 1412 in the path 1410 of the bird object 1420, thus attaching the associated animation to the particular control point 1412. The bird will therefore be rendered with the attached animation once it reaches the particular control point 1412. FIG. 14 further illustrates various controls 1430 affixed to the avatar's right arm 1440, including a control 1430*a* for manipulating the playback speed of the path.

Figure 15:
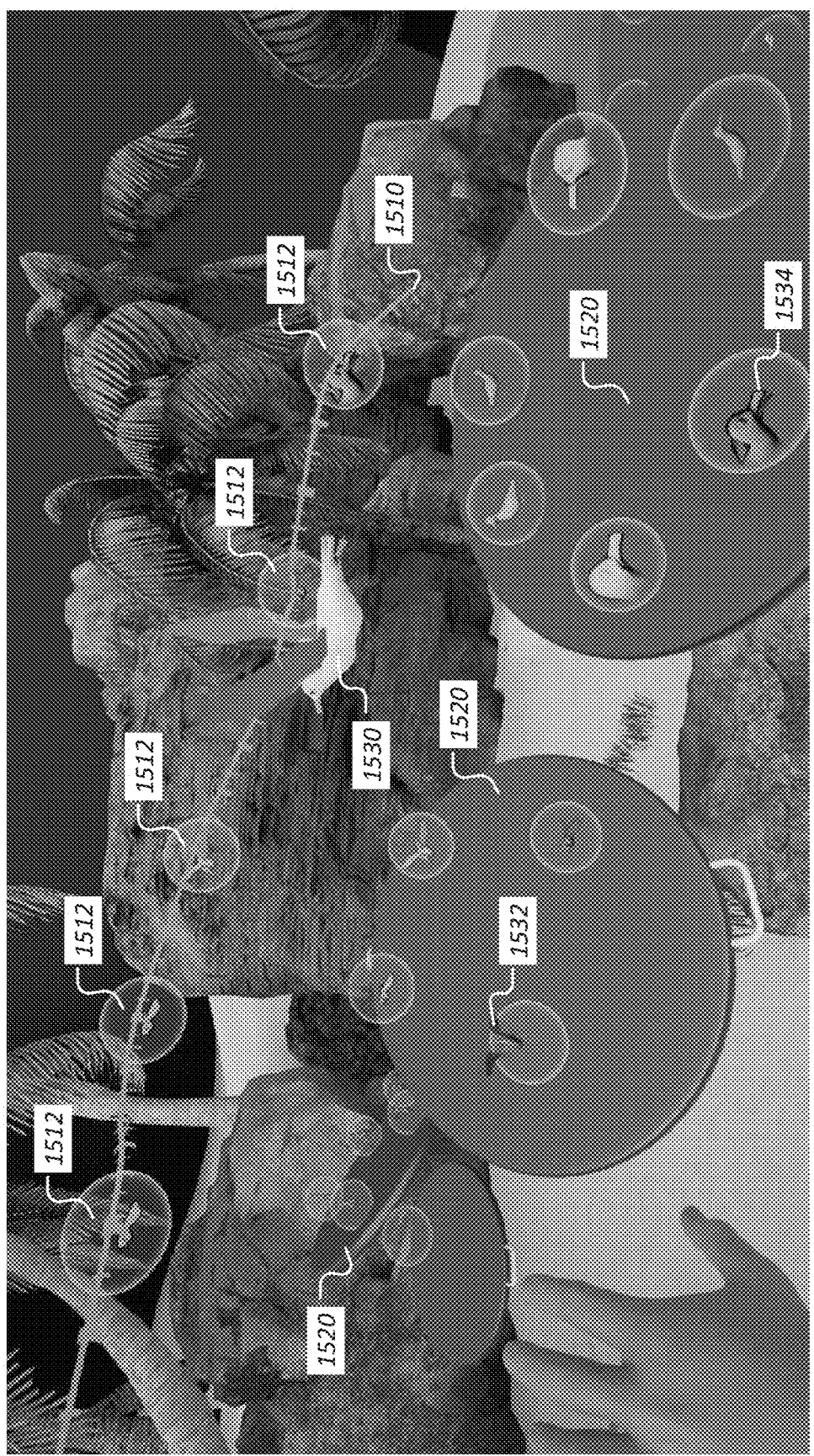
FIG. 15 illustrates, among other aspects, a path with a number of additional animations.

FIG. 15 illustrates, among other aspects, a viewport 1500 comprising a path 1510 with a number of additional animations 1512. Note that more than one animation turntable 1520 is now available for the bird object 1530 (e.g. at the request of the user, or in response to the user focusing on the path 1510). Each turntable 1520 comprises animations for a different feature of the bird object 1530 (e.g. wings 1532, beak 1534, etc.).

Figure 16:
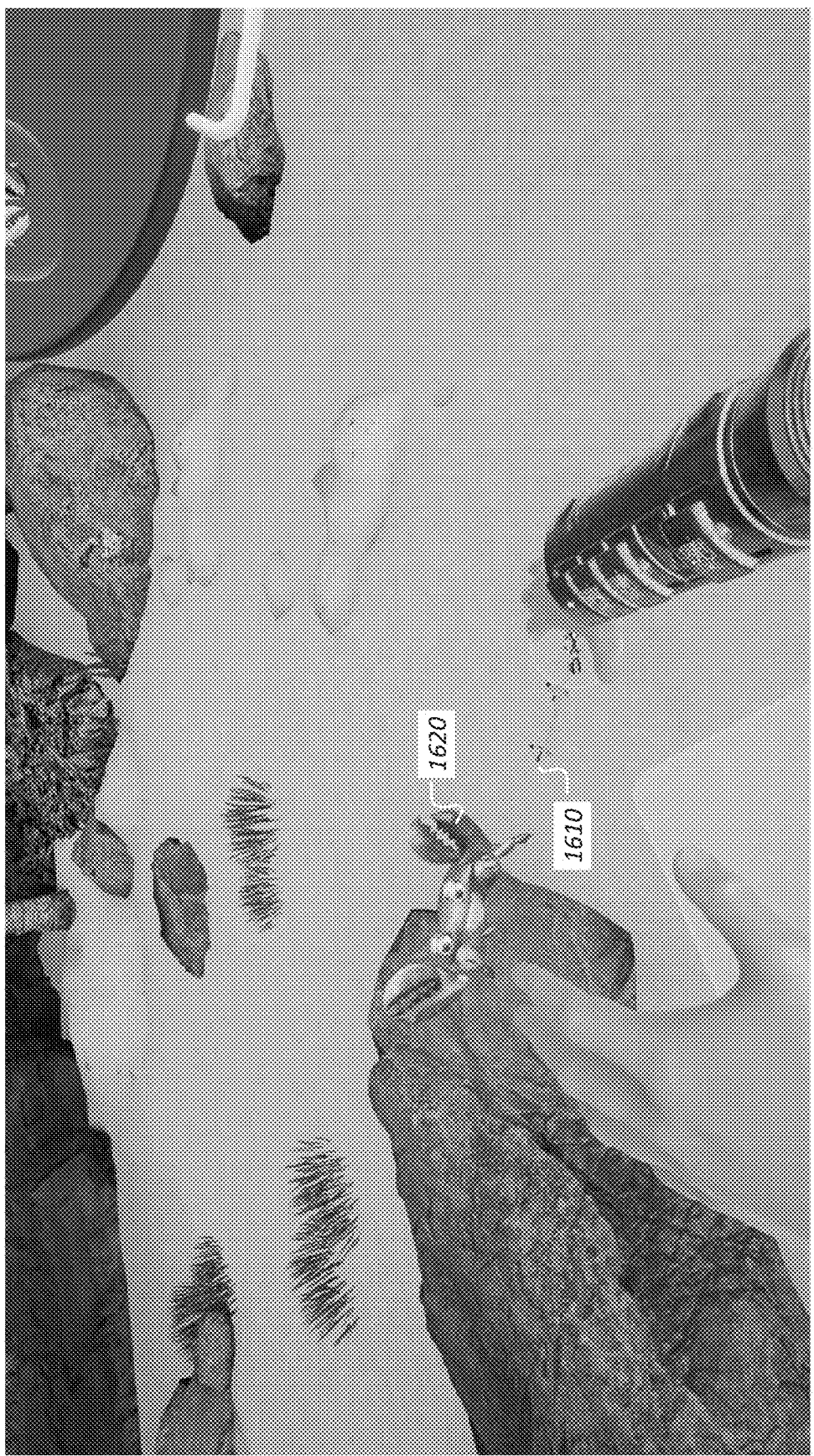
FIG. 16 illustrates, among other aspects, deletion of a portion of a path for an object.

FIG. 16 illustrates, among other aspects, deletion of a portion of a path 1610 for an object 1620. As depicted in the viewport 1600, the path 1610, which was formerly visible in FIG. 12, is now partially deleted on account of a user having submitted "erase" input while the avatar was touching the now-deleted portion.

4.2. Example VR-Assisted Content Development Walkthrough

In an embodiment, an example VR environment allows a user to build VR character content as well as setup character interactivity. The VR environment enables this using VR and motion controllers to make content creation easy and intuitive. The VR environment stores content on the cloud to make the content easy to access and share. The example is described from the user's perspective. It will be appreciated that the user's visual perceptions are of the VR environment, as displayed by VR devices. For example, the user's perception of the user and his/her body parts would in fact be a visual perception of an avatar representing the user within the VR environment.

A user may use characters and animation stored in a cloud marketplace, making it easy to share parts of the user's content with other users, and to buy characters or animations off of the cloud marketplace. These characters and animation are downloaded or streamed to an app that implements the VR environment each time they are used, giving content creators full control over how and where their character and animation assets are used. For example, the characters and animations may be developed over time, such that the same scene might appear differently if rendered at different times based on the continuing development of the characters or animations that the scene creator imported into the scene.

The VR environment has a built-in tutorial that teaches the user how to use the environment. The tutorial walks the user through some or all of the available tools in a white room, then switches to the full environment to let the user start doing work on the user's own.

If the user needs help, the user can always look at the digital assistant sitting on a shelf in the user's VR environment. The user may look at the character and say 'help' (i.e. using voice recognition) or ask about a specific topic, and the character will help the user by explaining things to the user and/or acting out the right things the user should do. This keeps the user from taking off the user's headset to look at a video or webpage—the user stays immersed in VR and gets help from a character rather than an impersonal page or video. In one particular implementation, the assistant takes on the appearance of a crab, but the user can change the appearance and voice of this character (i.e. make it a bird or celebrity instead of a crab) for a small micro transaction fee.

The tutorial starts with a crab in front of the user (the user's digital assistant) and a bird. The digital assistant tells the user to pick up the crab by moving the user's hand (via a motion controller) and hitting a trigger to pick up the bird. The bird is now in the user's hand and the user can move it around. Next, the user can hold down a grip button on the motion controller to trace out a path. A blue line appears for the path. When the user lets go of the grip button, the user can push up on a motion controller disk to watch the character move along the path. The bird will fly along the path. The user can grab control points on the path and move them around in 3D space. There is no need to try something on flatscreen software and hope it works in VR—the user can see and experience it directly.

Next the tutorial directs the user's attention to a tray on the user's left. That tray has a handle so the user can grab it with a motion controller and move it around. There are "bubbles" on the tray, each with a miniature bird inside playing an animation—flapping wings, walking around, opening mouth, etc. The user can pick up these bubbles and drop them on the animation path. Now, when the user pushes up on the disk to move the bird along the path, the bird will animate when it hits the bubble on the path. When the bird hits the wing-flapping bubble, it flaps its wings. The bird opens its mouth when it hits the mouth open bubble, and so forth. This is the essence of animation, and the user has done it in 1 minute (rather than after hours on flatscreen software, with weeks of intensive training necessary just to get started).

Next the tutorial asks the user to look at the user's hands. When the user does so, user's arms appear. The user is wearing metal "gauntlets" on the user's arms, with buttons on them, but ending at the wrist so the user's hands are free. The motion controllers vibrate to help direct the user's attention to them.

The user's right gauntlet has tool virtual buttons affixed to it. The first virtual button is the 'eraser' button. The user activates the eraser tool by pushing the eraser button with the user's left hand. As the user's hand approaches the gauntlet, the hand turns into a finger, and the user uses a physical left trigger button to push the virtual button. The button highlights when the finger is over the button, so the user know which button the user will push.

The first button is the 'eraser' button. When the user clicks on it, an eraser appears in the user's right hand. The user can use the right trigger button to erase bubbles and parts of the curve. On the underside of the eraser is an 'erase all' option. The user can flip the user's hand over so the user sees it, then use the user's left finger to push it. This erases every curve and bubble the user has placed. By placing the erase all button on the underside, the user can easily get to it but should not accidentally click it.

Next the tutorial walks the user through a second button, which is a 'freeze ray' button. Selection of this button puts a 'freeze gun' into the user's hands. When the user aims the gun at a bubble and pushes the physical trigger button, the bubble turns into an 'ice cube'. When a character is moving along the path and hits an 'ice cube', it behaves different. Now the character stops moving along the path and plays the animation. Once the animation is completed, the character resumes moving along the path. The user can use the gun on an ice cube to turn it back into a bubble. This is used for places where the character needs to stop and do something before continuing along.

A third button is a 'speed up animation' button. When the user pushes this button, a digital readout on the gauntlet changes to show that the user has increased the speed of animation playback. Now the characters move along paths quicker and animations play faster. The fourth button is a 'slow down' animation button that slows playback down.

The tutorial now fades out from white to reveal the full environment. The user is on a beach, smaller than normal scale. Instead of being life sized, the beach is about the size of a table. If the user has certain equipment, the user can walk around the room in real life and see himself or herself moving around the environment.

The left gauntlet has navigation buttons. The first three buttons have colored cubes. The user uses the right hand to push these buttons (again the right hand turns into a pointed finger when close to the left gauntlet). When the user clicks the trigger to push a colored cube button, the user teleports to a different location in the environment. The tutorial points out that there are three colored cubes in the environment that the user can pick up and move around. Pushing a colored cube button on the gauntlet teleports the user to that place. This is a shortcut way to move around set points in the environment.

The left gauntlet also has a + and − button. Pushing + scales up the world so it feels bigger, and − makes the world smaller. This is used so the user can work in different scales making the world smaller if the user wants to setup paths that move a long distance, and making it bigger if the user want to work on details or see what the world is like for a consumer.

These basic tools are more than enough for people to make a story. The tutorial also points out a crab on the ground. The user can also move the crab around in a path similar to the bird, and there is a second movable tray with bubbles on it. This tray shows crab animations (walking around, waving claws, etc).

If the user looks up, the user sees two clouds. These are used to save and load files. The VR environment saves data to the cloud, hence the cloud objects. The clouds are above the user's head so the user can easily find them, but they do not get in the user's way most of the time. A user may click a trigger while looking at the cloud to save to the current scene to the cloud. The program may pause for a second as the data is saved.

The user may grab a cloud and move it to the user's head (so the user's head is inside the cloud), then release it to load from that cloud (the user is 'putting himself or herself into the cloud's data'). After a short pause the user see that new data has been loaded (different paths and bubbles).

4.3. Example Character Interaction Graph Creation Flow

Figure 6:
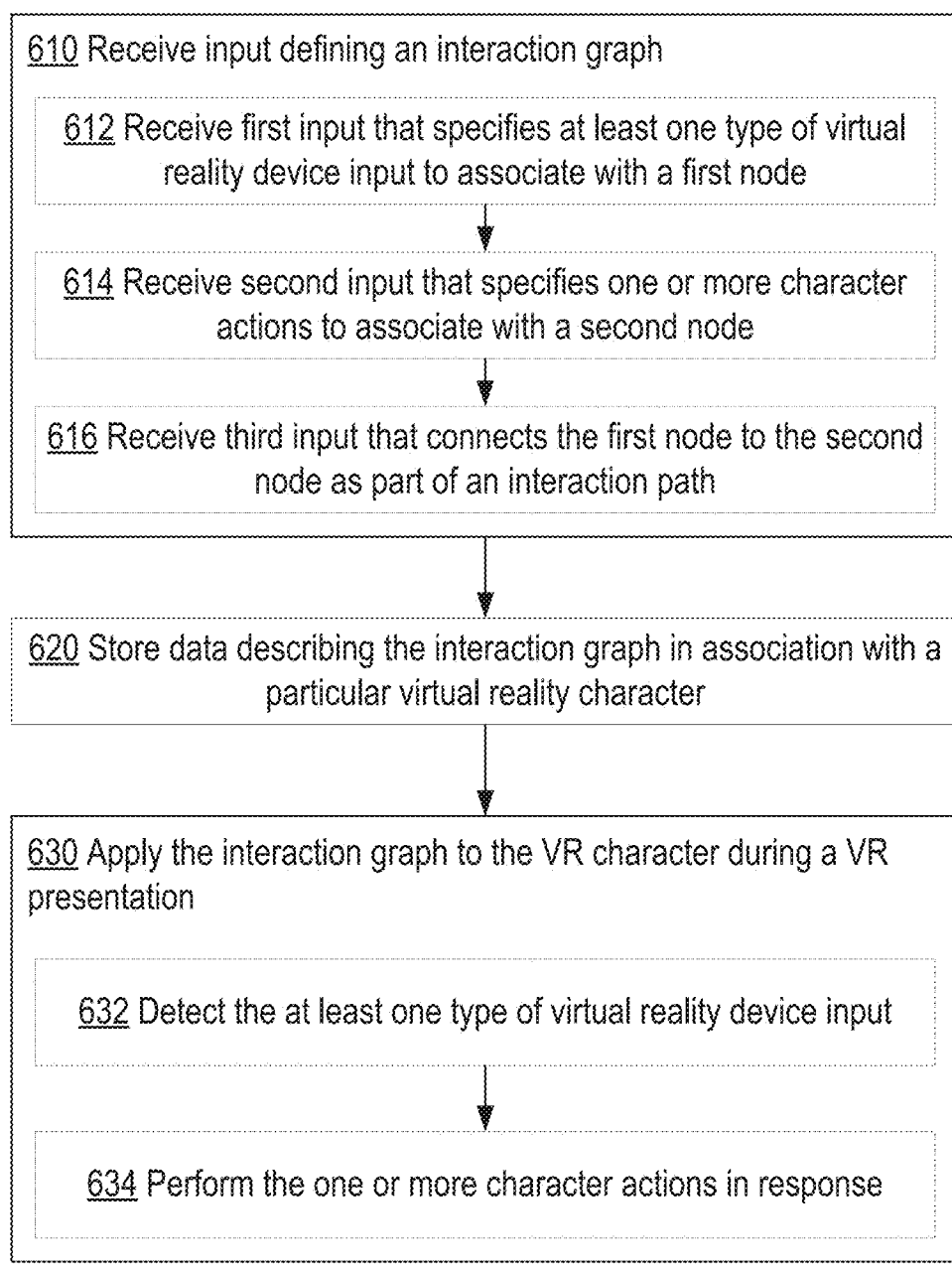
FIG. 6 is a flow diagram illustrating a process for creating VR character interaction graphs, and for applying an interaction graph to one or more VR characters, in accordance with one or more embodiments.

FIG. 6 depicts an example flow diagram of a flow 600 for creating a character interaction graph, according to an embodiment. Steps shown in FIG. 6 may be rearranged or omitted. Furthermore, additional steps not shown in FIG. 6 may be performed in accordance with one or more embodiments. Accordingly, the selection or arrangement of steps shown in FIG. 6 should not be construed as limiting.

At block 610, a computing device receives input defining an interaction graph. In an embodiment, the interaction graph comprises a plurality of nodes collectively defining one or more interaction paths for a virtual reality (VR) character. The interactive graph may be defined using a variety of input types, such as input received using VR-assisted techniques and/or other inputs described herein.

For example, block 610 may comprise sub-blocks 612-616. Block 612 comprises receiving first input that specifies at least one type of virtual reality device input to associate with a first node. The at least one type of virtual reality device input may, in an embodiment, include at least one of: voice input, gaze input, motion input, location input, or any other suitable input. Block 614 comprises receiving second input that specifies one or more character actions to associate with a second node. In an embodiment, the one or more character actions include one or more of: rendering a specified character animation, moving the virtual reality character along a specified object path, instigating a specified character dialog, or any other suitable action. In an embodiment, the second input selects the one or more actions from a set of actions defined for one or more virtual reality characters via a common character application programming interface. Hence, a generic action implemented by many different characters (though not necessarily in the exact same manner) may be chosen. Block 616 comprises receiving third input that connects the first node to the second node as part of an interaction path. Similar steps may be performed for any number of additional nodes.

For example, as described above in reference to FIG. 3, an interaction graph 300 may include a plurality of nodes (e.g., nodes 302-316) collectively defining various interaction paths for a character. Decision node 310 is an example of a node specifying various types of input (e.g., one or more possible voice inputs) and connections to other action nodes that indicate actions for the character to perform in response to detecting each type of input.

Block 620 comprises storing data describing the interaction graph in association with a particular virtual reality character. This data may take any form and be stored in any suitable storage location. In a cloud-based embodiment, for example, the data may be stored at a cloud-based server and then streamed to clients on demand. Moreover, the virtual reality character associated with the interaction graph may change depending on the context. For example, in at least one embodiment, interaction graphs may be dynamically linked to different characters in a library of characters on account of shared application programming interfaces that permit re-usability of the interaction graphs.

At block 630, the interaction graph is applied to the associated VR character during a VR presentation in which the VR character has been placed. For instance, blocks 630 may comprise sub-blocks 632 and 634. Block 632 comprises detecting the at least one type of virtual reality device input that was associated with the first node in block 612. Block 634 comprises, in response, performing the one or more character actions associated with the second node in bock 614.

In one embodiment, an interaction graph may be automatically applied to a VR character based on a user selecting the character from one or more interfaces. For example, a content creator may select a character in another design interface and provide input indicating that the user desires to create an interaction graph for the character. In response to the input, an interaction graph designer interface (e.g., interface 300, 400) may be displayed which enables the user to create the graph for the character. The user may then provide input to apply the created graph to the character. The information for the interaction graph may be stored as part of the character data, or stored separately and refer to the selected character.

4.4. Example Path Creation Flow

FIG. 17 depicts an example flow diagram of a flow 1700 for creating a character interaction graph, according to an embodiment. Steps shown in FIG. 17 may be rearranged or omitted. Furthermore, additional steps not shown in FIG. 17 may be performed in accordance with one or more embodiments. Accordingly, the selection or arrangement of steps shown in FIG. 17 should not be construed as limiting.

Block 1710 comprises presenting a virtual reality user interface, such as described elsewhere herein. The interface will generally include at least an avatar and visual representations of objects.

Block 1720 comprises, in the virtual reality user interface, receiving object selection input that selects an object. The object selection input may, for example, move at least a portion of a user avatar, such as a finger or a hand, towards a visual representation of the object in a three-dimensional space. For instance, the hand of the avatar may grab or grasp the object's visual representation to select. Examples of these and other suitable selection techniques are described in other sections.

Block 1730 comprises activating a path definition mode. Activating the path definition mode may occur automatically in response to block 1720, or in response to selection of a certain command from a menu, such as an avatar affixed menu, turntable, or other menu described herein. Bock 1730 may occur, in some embodiments, before block 1720.

Block 1740 comprises, while the object is selected and the path definition mode is active, receiving path definition input that moves at least a portion of the user avatar along an input path in the three-dimensional space. For instance, a user may move his hand that is holding the visual representation of the object along a path to define a path for the object. As another example, a user may "walk" the avatar around to define a path. These and other examples of suitable path definition inputs are described in other sections.

Block 1750 comprises, based on the path definition input, generating path definition data that describes an object path through the three-dimensional space. The object path may exactly correspond to the input path, or may be projected out into the three-dimensional space by some distance relative to the input path.

Block 1760 comprises storing the path definition data in association with the object. The path definition data may be stored locally, or in the cloud, using techniques such as already described.

Block 1765 comprises beginning a virtual reality presentation that includes the object. Block 1770 comprises, during the presentation, based on the path definition data, moving the object along the object path in the three-dimensional space. For instance, a user may decide to play the virtual reality presentation that the user is working on. In an embodiment, the user may watch the presentation in its entirety, or may pause the presentation at some point and make adjustments to the presentation. In an embodiment, the presentation may instead be played, potentially in a read-only mode, at another client belonging to another user.

Block 1775 comprises, optionally, based on the path definition data, displaying control points along the object path in the three-dimensional space, as described elsewhere. Block 1780 comprises receiving control point selection input that selects a particular control point of the control points, again as previously described. Block 1790 comprises receiving input that moves the control point or associates the control point with an action, such as an animation or interaction graph. Again, these and other manipulations are described in other sections.

5.0. Example Embodiments

Examples of some embodiments are represented, without limitation, in the following clauses:

According to an embodiment, a method comprises generating a scene of moving objects within a 3D space using VR-assisted item selection and placement techniques.

According to an embodiment, a method comprises defining a path of an object in a 3D space using a VR-assisted technique.

According to an embodiment, a method comprises receiving selection of options from a menu of options via virtual controls affixed to the body of an avatar in a VR environment.

According to an embodiment, a method comprises receiving selection of options from a menu of options via an avatar grabbing three-dimensional indicator icons within a container in a VR environment.

According to an embodiment, a method comprises providing assistance to a user via depicting, with a VR character, movements to accomplish an objective for which the user requested the assistance.

According to an embodiment, a method comprises receiving, by a computing device, input defining an interaction graph, the interaction graph comprising a plurality of nodes collectively defining one or more interaction paths for a virtual reality (VR) character; wherein at least one node of the interaction graph specifies (a) at least one type of VR device input, and (b) a connection to another node of the interaction graph specifying one or more character actions to perform in response to detecting the at least one type of VR device input; applying the interaction path to the virtual reality character.

In an embodiment, at least one type of VR device input includes one of: voice input, gaze input, motion input, location input.

In an embodiment, the one or more character actions include one or more of: a character animation clip, a character dialog clip.

In an embodiment, the input defining the interaction graph is received by a graphical interface displayed in a VR environment.

In an embodiment, the creation interface is cloud based, and wherein the character is streamed.

According to an embodiment, a system comprises a marketplace of individually purchasable VR assets and an associated repository of user-shareable VR scenes comprising various arrangements of the VR assets.

According to an embodiment, a method comprises receiving input defining an interaction graph, the interaction graph comprising a plurality of interconnected nodes collectively defining one or more interaction paths for virtual reality characters, the receiving of the input including at least: receiving first input that specifies at least one type of virtual reality device input to associate with a first node; receiving second input that specifies one or more character actions to associate with a second node; receiving third input that connects the first node to the second node as part of an interaction path; storing data describing the interaction graph in association with a particular virtual reality character; and based on the data describing the interaction graph, during a virtual reality presentation that includes the virtual reality character, applying the one or more interaction paths to the virtual reality character, the applying including performing the one or more character actions in response to detecting the at least one type of virtual reality device input.

In an embodiment, the at least one type of virtual reality device input includes at least one of: voice input, gaze input, motion input, or location input.

In an embodiment, the one or more character actions include one or more of: rendering a specified character animation, moving the virtual reality character along a specified object path, or instigating a specified character dialog.

In an embodiment, the input defining the interaction graph is received via a graphical interface displayed in a virtual reality environment.

In an embodiment, the method further comprises storing the data describing the interaction graph and the virtual reality character in a cloud-based server, and streaming the data describing the interaction graph and the virtual reality character to a client while the client is presenting the virtual reality presentation.

In an embodiment, the method further comprises storing data describing a plurality of virtual reality characters on a server that sends data necessary to render the virtual reality presentation to multiple clients, wherein different virtual reality characters are associated with the interaction graph at different clients presenting the virtual reality presentation based on access controls and/or user preferences associated with the different clients.

In an embodiment, the second input selects the one or more actions from a set of actions defined for one or more virtual reality characters via a common character application programming interface.

According to an embodiment, a method comprises, in a virtual reality user interface, receiving object selection input that selects an object, the object selection input moving at least a portion of a user avatar towards a visual representation of the object in a three-dimensional space; while the object is selected, receiving path definition input that moves at least a portion of the user avatar along an input path in the three-dimensional space; based on the path definition input, generating path definition data that describes an object path through the three-dimensional space; storing the path definition data in association with the object; during a virtual reality presentation that includes the object, based on the path definition data, moving the object along the object path in the three-dimensional space.

In an embodiment, receiving the selection input comprises determining from one or more virtual reality input device types that a user is grabbing the object with a hand of the avatar.

In an embodiment, the input path corresponds to hand movement of a user and/or movement of the avatar in the three-dimensional space.

In an embodiment, the method further comprises: determining that path definition input is being provided in response to menu option selection input selecting a path creation option from menu affixed to a limb of the avatar.

In an embodiment, the method further comprises: based on the path definition data, displaying control points along the object path in the three-dimensional space; receiving control point selection input that selects a particular control point of the control points; while the particular control point is selected, receiving path manipulation input that moves at least a portion of the avatar in the three-dimensional space; moving the particular control point to a position within the three-dimensional space indicated by the path manipulation input; updating the path definition data to reflect the changed position of the particular control point.

In an embodiment, the method further comprises: based on the path definition data, displaying control points along the object path in the three-dimensional space; receiving control point selection input that selects a particular control point of the control points; while the particular control point is selected, receiving object manipulation input that specifies an action to be taken; during the virtual reality presentation, based on the object manipulation input, performing the action with respect to the object when the object is at the particular control point.

In an embodiment, the object manipulation input comprises a selection of a visual representation of the action from a container displayed in the three-dimensional space, the method further comprising, upon selection of the visual representation of the action, displaying the visual representation of the action at the particular control point.

In an embodiment, the visual representation of the action is a three-dimensional animation within a sphere, and the container is a turntable comprising a number of spheres corresponding to different actions.

In an embodiment, the method further comprises: receiving interaction input defining an interaction graph to associate with the object, the interaction graph comprising a plurality of interconnected nodes collectively defining one or more interaction paths; while the object is moving along the object path during the virtual reality presentation, responsive to detecting a condition associated with a first node of the interaction graph, performing one or more actions in association with the object, the one or more actions described by an interaction path beginning at the first node.

In an embodiment, the method further comprises pausing the virtual reality presentation and, while the virtual reality presentation is paused, receiving input that moves a control point of the object path with a hand of the avatar, and, in response, adjusting the object path.

According to an embodiment, a system comprises one or more storage devices storing character data describing virtual reality characters, interaction data describing interaction logic, object path data describing movements of objects within three-dimensional spaces, and virtual reality presentation data describing virtual reality presentations in which selected virtual reality characters move in accordance with the object path data and/or interact with users in accordance with the interaction logic; logic, at a server communicatively coupled to the one or more storage devices, configured to stream requested character data, interaction data, and object path data to virtual reality client devices based on selected virtual reality presentation data; logic, at a server communicatively coupled to the one or more storage devices, configured to instruct particular virtual reality client devices to present virtual-reality-based graphical user interfaces for defining the character data, interaction data, object data, and virtual reality presentation data, and to update the stored character data, interaction data, object data, and virtual reality presentation data in response to input received via the virtual-reality-based graphical user interfaces.

In an embodiment, the one or more storage devices further store access control data indicating which of the virtual reality client devices can access particular character data of the stored character data.

In an embodiment, each character described by the character data is defined at least in part using a shared character application programming interface for presenting characters in a virtual reality environment.

Other examples of these and other embodiments are found throughout this disclosure.

6.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
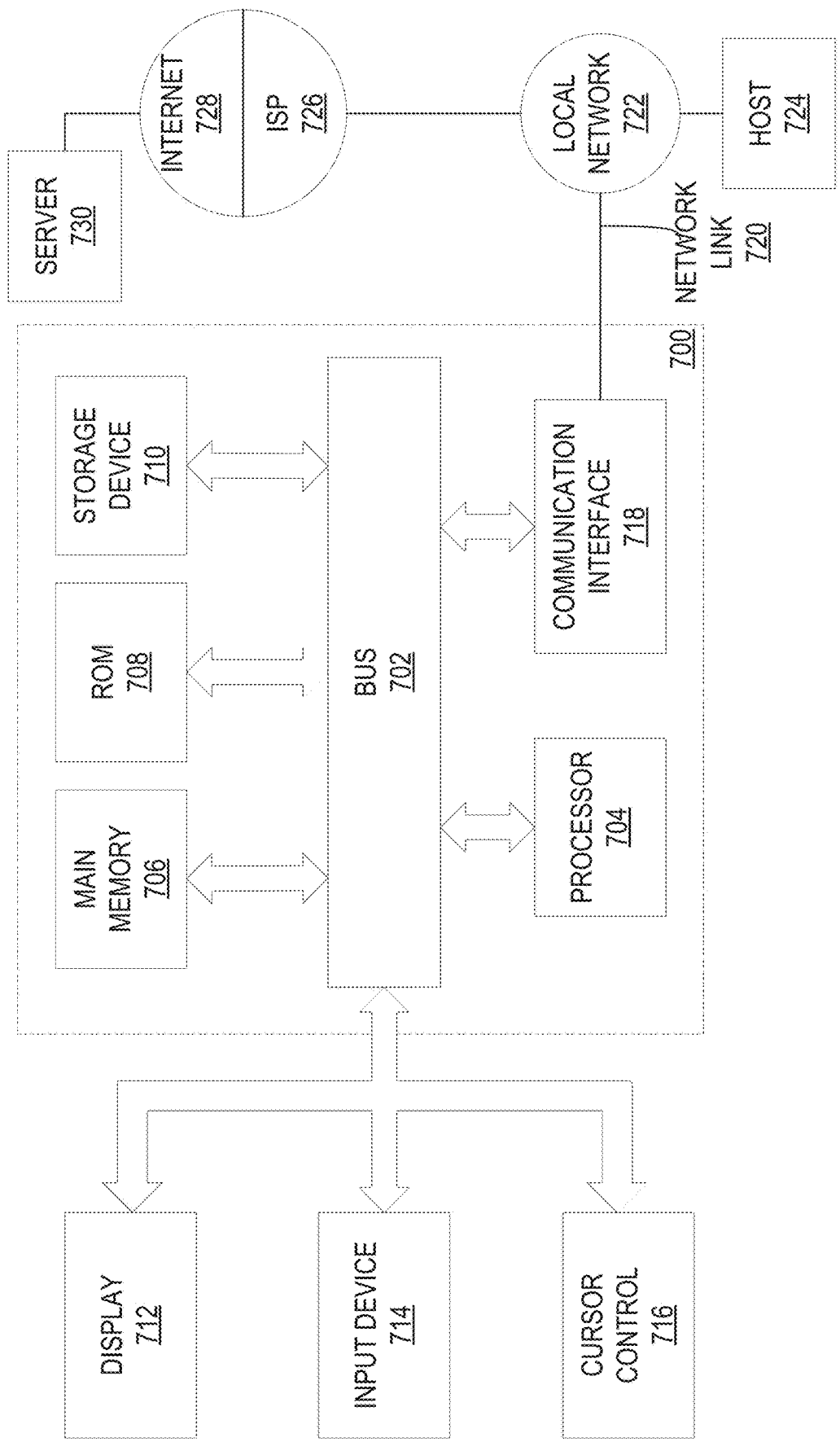
FIG. 7 is block diagram of a computer system upon which embodiments of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In an embodiment, some or all of the systems described herein may be or comprise server computer systems, including one or more server computer devices that collectively implement various components of the system as a set of server-side processes. The server computer systems may include web server, application server, database server, and/or other conventional server components that the depicted components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third third-party entities, on behalf of another entity for whom the components are deployed. In other embodiments, however, the described systems may be implemented entirely by computer systems owned and operated by a single entity.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer readable media storing instructions which, when executed by one or more processors, cause:
   receiving input defining an interaction graph, the interaction graph comprising a plurality of interconnected nodes collectively defining one or more interaction paths for virtual reality characters during an interactive virtual reality experience, the receiving of the input including at least:
      receiving first input that specifies at least one type of virtual reality device input to be received from a user during the interactive virtual reality experience to associate with a first node;
      receiving second input that specifies one or more character actions to associate with a second node;
      receiving third input that connects the first node to the second node as part of an interaction path;
   storing data describing the interaction graph in association with a particular virtual reality character; and
   based on the data describing the interaction graph, during the interactive virtual reality experience that includes the virtual reality character, applying the one or more interaction paths to the virtual reality character, the applying including performing the one or more character actions in response to detecting the at least one type of virtual reality device input from the user.

2. The one or more non-transitory computer readable media of claim 1, wherein the at least one type of virtual reality device input includes at least one of: voice input from the user, gaze input from the user, motion input from the user, or location input from the user.

3. The one or more non-transitory computer readable media of claim 1, wherein the one or more character actions include one or more of: rendering a specified character animation, moving the virtual reality character along a specified object path, or instigating a specified character dialog.

4. The one or more non-transitory computer readable media of claim 1, wherein the input defining the interaction graph is received via a graphical interface displayed in as part of the interactive virtual reality experience.

5. The one or more non-transitory computer readable media of claim 1, wherein the instructions, when executed by one or more processors, further cause storing the data describing the interaction graph and the virtual reality character in a cloud-based server, and streaming the data describing the interaction graph and the virtual reality character to a client while the client is presenting the interactive virtual reality experience.

6. The one or more non-transitory computer readable media of claim 1, wherein the instructions, when executed by one or more processors, further cause storing data describing a plurality of virtual reality characters on a server that sends data necessary to render the virtual reality experience for multiple clients, wherein different virtual reality characters are associated with the interaction graph at different clients presenting the interactive virtual reality experience based on at least one of access controls and user preferences associated with the different clients.

7. The one or more non-transitory computer readable media of claim 1, wherein the second input selects the one or more character actions from a set of character actions defined for one or more virtual reality characters via a common character application programming interface.

8. A computer-implemented method, comprising:
   receiving input defining an interaction graph, the interaction graph comprising a plurality of interconnected nodes collectively defining one or more interaction paths for virtual reality characters during an interactive virtual reality experience, the receiving of the input including at least:
      receiving first input that specifies at least one type of virtual reality device input to be received from a user during the interactive virtual reality experience to associate with a first node;
      receiving second input that specifies one or more character actions to associate with a second node;
      receiving third input that connects the first node to the second node as part of an interaction path;
   storing data describing the interaction graph in association with a particular virtual reality character; and
   based on the data describing the interaction graph, during the interactive virtual reality experience that includes the virtual reality character, applying the one or more interaction paths to the virtual reality character, the applying including performing the one or more character actions in response to detecting the at least one type of virtual reality device input from the user.

9. The method of claim 8, wherein the at least one type of virtual reality device input includes at least one of: voice input from the user, gaze input from the user, motion input from the user, or location input from the user.

10. The method of claim 8, wherein the one or more character actions include one or more of: rendering a specified character animation, moving the virtual reality character along a specified object path, or instigating a specified character dialog.

11. The method of claim 8, wherein the input defining the interaction graph is received via a graphical interface displayed in as part of the interactive virtual reality experience.

12. The method of claim 8, further comprising:
   storing the data describing the interaction graph and the virtual reality character in a cloud-based server, and streaming the data describing the interaction graph and the virtual reality character to a client while the client is presenting the interactive virtual reality experience.

13. The method of claim 8, further comprising:
storing data describing a plurality of virtual reality characters on a server that sends data necessary to render the virtual reality experience for multiple clients, wherein different virtual reality characters are associated with the interaction graph at different clients presenting the interactive virtual reality experience based on at least one of access controls and user preferences associated with the different clients.

14. The method of claim 8, wherein the second input selects the one or more character actions from a set of character actions defined for one or more virtual reality characters via a common character application programming interface.

* * * * *